(12) United States Patent
Manne et al.

(10) Patent No.: US 11,854,365 B2
(45) Date of Patent: *Dec. 26, 2023

(54) GRAPHICAL USER INTERFACE AND NETWORKED SYSTEM FOR MANAGING DYNAMIC GEO-FENCING FOR A PERSONAL COMPLIANCE-MONITORING DEVICE

(71) Applicant: TRACKtech, LLC, Greenwood Village, CO (US)

(72) Inventors: Vik Manne, Greenwood Village, CO (US); Michael Hirschman, Greenwood Village, CO (US); Nils LaVine, Boulder, CO (US)

(73) Assignee: TRACKtech, LLC, Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/562,748

(22) Filed: Dec. 27, 2021

(65) Prior Publication Data

US 2022/0189276 A1    Jun. 16, 2022

Related U.S. Application Data

(63) Continuation of application No. 16/848,155, filed on Apr. 14, 2020, now Pat. No. 11,210,921.
(Continued)

(51) Int. Cl.
*G08B 21/02* (2006.01)
*H04W 4/021* (2018.01)
*G08B 29/18* (2006.01)

(52) U.S. Cl.
CPC ....... *G08B 21/0261* (2013.01); *G08B 29/186* (2013.01); *H04W 4/021* (2013.01)

(58) Field of Classification Search
CPC .. G08B 21/0261; G08B 29/186; H04W 4/021
See application file for complete search history.

(56) References Cited

U.S. PATENT DOCUMENTS 8,326,315 B2    12/2012   Phillips et al.
9,773,392 B2     9/2017   Rajala
(Continued)

OTHER PUBLICATIONS

Beisley et al., "Electronic Monitoring of Curfew Compliance for Violent Offenders—An Evidence-Based Policing Approach," Australia & New Zealand Society of Evidence Based Policing, known at least as early as Apr. 17, 2019, pp. 42-47.
(Continued)

*Primary Examiner* — Hongmin Fan
(74) *Attorney, Agent, or Firm* — Brownstein Hyatt Farber Schreck, LLP

(57) ABSTRACT

A system performs compliance control. This may include a compliance-control device displaying a map, receiving a selection of a location from the map, determining an entity associated with the selection, generating a geo-fence boundary around the selection using a library of geo-fence shapes, and determining a compliance condition with the geo-fence boundary by communicating with a compliance-monitoring device. In various examples, the compliance-monitoring device may determine and transmit a compliance condition on a first time interval. In response to a breach event, the compliance-monitoring device may determine and transmit a set of subsequent compliance conditions on a second time interval that is shorter than the first time interval. The compliance-control device may display a graphical output that corresponds to the compliance condition and one or more of the subsequent compliance conditions.

20 Claims, 14 Drawing Sheets

Related U.S. Application Data

(60) Provisional application No. 62/835,107, filed on Apr. 17, 2019.

(56) References Cited

U.S. PATENT DOCUMENTS

| | | |
|---|---|---|
| 11,416,958 B1 * | 8/2022 | Reichert ............ G06Q 10/1091 |
| 2007/0143013 A1 * | 6/2007 | Breen ................. G01S 5/0027 |
| | | 701/32.3 |
| 2010/0042940 A1 * | 2/2010 | Monday ............... G09B 29/106 |
| | | 715/764 |
| 2012/0268269 A1 | 10/2012 | Doyle |
| 2016/0117910 A1 | 4/2016 | Rajala |
| 2017/0006419 A1 | 1/2017 | Rajala et al. |
| 2017/0293989 A1 | 10/2017 | Hodge |
| 2018/0176727 A1 | 6/2018 | Williams |

OTHER PUBLICATIONS

Sierra Wireless, Omnilink Electronic Monitoring Solutions, www.sierrasolutionsapp.com/?products=electronic-monitoring-solution, known at least as early as Apr. 17, 2019, 3 pages.

* cited by examiner

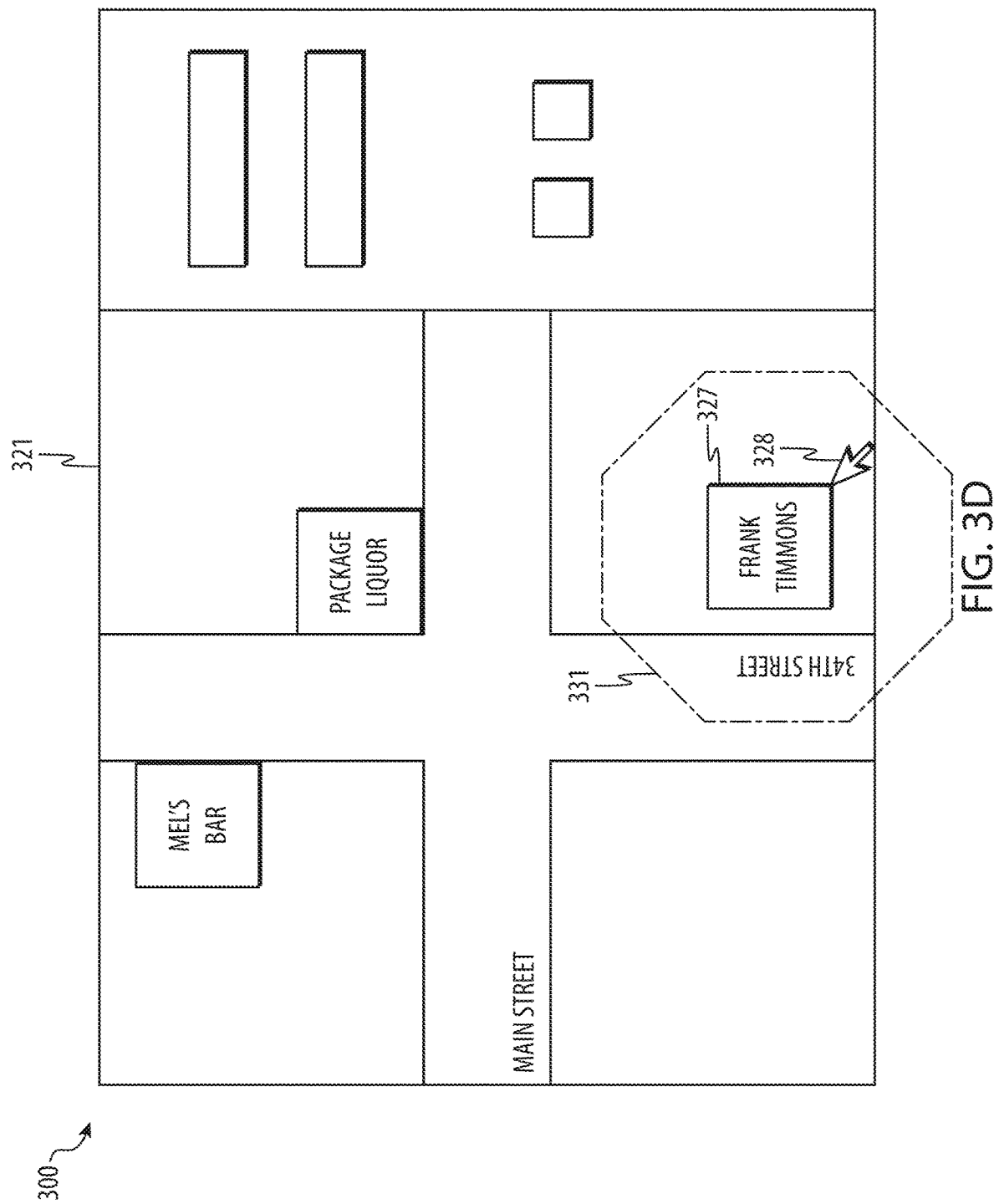

GRAPHICAL USER INTERFACE AND NETWORKED SYSTEM FOR MANAGING DYNAMIC GEO-FENCING FOR A PERSONAL COMPLIANCE-MONITORING DEVICE

CROSS-REFERENCE TO RELATED APPLICATION(S)

This application is a continuation of U.S. patent application Ser. No. 16/848,155, filed Apr. 14, 2020, which is a nonprovisional patent application of and claims the benefit of U.S. Provisional Patent Application No. 62/835,107, filed Apr. 17, 2019, the disclosures of which are hereby incorporated herein by reference in their entirety.

FIELD

The described embodiments relate generally to personal compliance condition monitoring. More particularly, the present embodiments relate to dynamic geo-fencing for personal compliance condition monitoring.

BACKGROUND

People may participate in a variety of different programs where their behavior is monitored and/or evaluated to determine their compliance condition with one or more agreements and/or conditions (i.e., whether or not they are compliant with the one or more agreements and/or conditions). For example, people on probation and/or parole may be subject to one or more agreements and/or conditions in order to avoid and/or be released from incarceration. One or more probation/parole or similar officers may monitor and/or evaluate a person's behavior to determine whether or not the person's compliance condition is compliant. Compliance condition failure may result in adverse recommendations, censure, penalties, and/or law enforcement alerts.

By way of illustration, people may be required to be in particular locations at particular times (such as work during work hours and/or home during home hours) and/or avoid particular locations and/or particular people (such as avoid bars, liquor stores, dispensaries, gambling venues, criminal associates, victims, and/or schools). A person may be supplied with an ankle monitor or other device that enables tracking of the person's location. However, traditional ankle monitors or similar devices may be tied to a specific boundary like a residence or facility. The systems and techniques described herein may be used to define and manage a system of dynamic geo-fences in a way that overcomes limitations with some existing or more traditional ankle monitor systems.

SUMMARY

The present disclosure relates to a system that performs compliance control. This may include a compliance-control device displaying a map, receiving a selection of a location from the map, determining an entity associated with the selection, generating a geo-fence boundary around the selection using a library of geo-fence shapes, and determining a compliance condition with the geo-fence boundary by communicating with a compliance-monitoring device. In some examples, the location may correspond to the compliance-monitoring device and the geo-fence boundary may be updated according to movement of the compliance-monitoring device. In various examples, the geo-fence boundary may be transmitted to the compliance-monitoring device and the compliance condition may be determined according to information received from the compliance-monitoring device regarding whether or not the compliance-monitoring device is within the geo-fence boundary. In various examples, the compliance-monitoring device may determine and transmit a compliance condition on a first time interval. In response to a breach event, the compliance-monitoring device may determine and transmit a set of subsequent compliance conditions on a second time interval that is shorter than the first time interval. The compliance-control device may display a graphical output that corresponds to the compliance condition and one or more of the subsequent compliance conditions. In this way, software and/or hardware resources can be conserved with less frequent compliance condition monitoring in the absence of a breach event, balanced with targeted increased resource consumption in response to detected breach.

In various embodiments, a compliance control system for monitoring a compliance-monitoring device over a geographic region includes a compliance-control device and a compliance-monitoring device communicably connected to the compliance-control device over a network. The compliance-control device is configured to display a graphical user interface including a map corresponding to at least a portion of the geographic region; and an interface configured to receive a selection of a set of geo-fence boundaries, each geo-fence boundary associated with a business or entity of the geographic region. The compliance monitoring device is configured to transmit an initial location to the compliance-control device; receive a subset of the set of geo-fence boundaries, the subset of geo-fence boundary selected, at least in part, based on the initial location; select a current geo-fence boundary from the set of geo-fence boundaries based, at least in part, on a current location of the compliance-monitoring device; determine a compliance condition of the current location of the compliance-monitoring device with respect to the current geo-fence boundary on a first time interval; transmit the compliance condition; in response to the compliance condition corresponding to the current location being within the current geo-fence boundary, record a breach event; in response to recording the breach event, determine a set of subsequent compliance conditions corresponding to a set of compliance-monitoring device locations; and transmit the set of subsequent compliance conditions on a second time interval that is shorter than the first time interval. The compliance-control device is configured to display a graphical output that corresponds to the compliance condition and one or more of the subsequent compliance conditions.

In some examples, the compliance-monitoring device is configured to determine whether to suppress a detected breach event by calculating a reporting measurement using a number of times the detected breach event is detected, an accuracy of the current location, and a deviation indication; suppressing the detected breach event in response to the reporting measurement not exceeding a threshold; and recording the detected breach event in the compliance log in response to the reporting measurement meeting or exceeding the threshold. In various implementations of such examples, the compliance-monitoring device determines a set of sample locations over a sample period of time. In a number of implementations of such examples, the compliance-monitoring device determines the number of times the detected breach event is detected using the set of sample locations. In various implementations of such examples, the compliance-monitoring device determines the deviation indication by comparing distances between locations of the set of sample locations.

In a number of examples, the compliance-monitoring device receives the subset of the set of geo-fence boundaries from the compliance-control device.

In various examples, the compliance-monitoring device records the breach event in a compliance log and transmits the compliance log to the compliance-control device. In some examples, the compliance-monitoring device transmits the compliance log to the compliance-control device on a third time interval that is longer than the first time interval. In a number of examples, the compliance-monitoring device determines the compliance condition by identifying the current geo-fence boundary of the set of geo-fence boundaries as having the smallest distance to a current location of the compliance-monitoring device and detecting when the current location is within the current geo-fence boundary. In various examples, the compliance-monitoring device determines that a detected breach event is a false positive non-compliance with the set of geo-fence boundaries and suppresses the detected breach event.

In some embodiments, a compliance control system for monitoring a compliance-monitoring device over a geographic region includes a compliance-control device and a compliance-monitoring device communicably connected to the compliance-control device over a network. The compliance-control device is configured to provide an interface; receive a selection of a type of entity for which to generate a geo-fence boundary via the interface; query a points of interest database using the type for at least a portion of the geographic region; receive location information for the type from the points of interest database; and generate the geo-fence boundary using the location information. The compliance-monitoring device is configured to determine and transmit a compliance condition of a current location of the compliance-monitoring device with respect to the geo-fence boundary to the compliance-control device.

In various examples, the compliance-control device generates the geo-fence boundary using a geo-fence shape selected from a library of geo-fence shapes according to the type. In some examples, the compliance-control device specifies an area associated with a monitored person when querying the points of interest database.

In a number of embodiments, a compliance-control device includes a non-transitory storage medium that stores instructions; and a processor that executes the instructions, the processor configured to display a map; receive a selection of a location from the map; determine an entity associated with the selection; generate a geo-fence boundary around the selection using a library of geo-fence shapes; receive a compliance condition of a current location of a compliance-monitoring device with respect to the geo-fence boundary on a first time interval; after detection of a breach event, receive a set of subsequent compliance conditions corresponding to a set of compliance-monitoring device locations on a second time interval that is shorter than the first time interval; and display a graphical output that corresponds to the compliance condition and one or more of the subsequent compliance conditions.

In some examples, the library includes a number of polygonal geo-fence shapes. In various examples, the library includes a number of different sized shapes. In a number of examples, the processor selects a shape from the library based on the entity. In various examples, the processor presents a shape menu in response to the selection and determines a shape from the library according to a menu selection from the shape menu.

In some examples, the processor transmits the geo-fence boundary to the compliance-monitoring device. In various implementations of such examples, the processor determines the breach event by evaluating the compliance condition to determine that the current location is within the geo-fence boundary.

In a number of embodiments, a compliance control system for monitoring a compliance-monitoring device over a geographic region includes a compliance-control device configured to display a graphical user interface having a map corresponding to at least a portion of the geographic region and an interface configured to receive a selection of a set of geo-fence boundaries, each geo-fence boundary associated with a business or entity of the geographic region. The compliance control system also includes a compliance-monitoring device communicably connected to the compliance-control device over a network. The compliance monitoring device is configured to transmit an initial location to the compliance-control device; receive a subset of the set of geo-fence boundaries, the subset of geo-fence boundary selected, at least in part, based on the initial location; select a current geo-fence boundary from the set of geo-fence boundaries based, at least in part, on a current location of the compliance-monitoring device; determine a compliance condition of the current location of the compliance-monitoring device with respect to the current geo-fence on a first time interval; record a breach event in a compliance log, in response to the current location being within the current geo-fence; and transmit the compliance log to the compliance-control device on a second time interval that is greater than the first time interval. The compliance-control device is configured to display a graphical output that corresponds to the compliance log in the graphical user interface.

In some examples, the compliance-monitoring device determines whether to suppress a detected breach event by calculating a reporting measurement using a number of times the detected breach event is detected, an accuracy of the current location, and a deviation indication; suppressing the detected breach event if the reporting measurement does not exceed a threshold; and recording the breach event in the compliance log if the reporting measurement at least meets the threshold. In various implementations of such examples, the compliance-monitoring device determines a sequence of locations over a period of time. In some examples of such implementations, the compliance-monitoring device determines the number of times the detected breach event is detected using the sequence of locations. In various examples of such implementations, the compliance-monitoring device determines the deviation indication by comparing locations of the sequence of locations.

In various examples, the compliance-monitoring device receives the subset of the set of geo-fence boundaries from the compliance-control device. In a number of examples, the compliance-monitoring device transmits the compliance log to the compliance-control device.

In various examples, the compliance-monitoring device determines the compliance by identifying a geo-fence boundary of the set of geo-fence boundaries having the smallest distance to a current location of the compliance-monitoring device at a first time interval and recording the breach event if the current location is within the geo-fence boundary. In some implementations of such examples, the compliance-monitoring device transmits the compliance log at a second time interval that is greater than the first time interval.

In a number of examples, the compliance-monitoring device suppresses a false positive non-compliance with the set of geo-fence boundaries.

In some embodiments, a compliance control system for monitoring a compliance-monitoring device over a geographic region includes a compliance-control device configured to provide an interface, receive a selection of a type of entity for which to generate a geo-fence boundary via the interface, query a points of interest database using the type for at least a portion of the geographic region, receive location information for the type from the points of interest database, and generate the geo-fence boundary using the location information. The compliance control system also includes a compliance-monitoring device communicably connected to the compliance-control device over a network. In a number of examples, the compliance-control device generates the geo-fence boundary using a geo-fence shape selected from a library of geo-fence shapes according to the type. In various examples, the compliance-control device specifies an area associated with a monitored person when querying the points of interest database.

In various embodiments, a compliance-control device includes a non-transitory storage medium that stores instructions and a processor. The processor executes the instructions to display a map, receive a selection of a location from the map, determine an entity associated with the selection, generate a geo-fence boundary around the selection using a library of geo-fence shapes, and determine compliance with the geo-fence boundary by communicating with a compliance-monitoring device.

In some examples, the library includes a number of polygonal geo-fence shapes. In various examples, the library includes a number of different sized shapes.

In a number of examples, the processor selects a shape from the library based on the entity. In various examples, the processor presents a shape menu in response to the selection and determines a shape from the library according to a menu selection from the shape menu.

In various examples, the processor transmits the geo-fence boundary to the compliance-monitoring device. In a number of implementations of such examples, the processor determines the compliance based on compliance information received from the compliance-monitoring device.

In some embodiments, a compliance-control computer program product is tangibly embodied in a non-transitory machine readable medium. The compliance-control computer program product includes a first set of instructions, stored in the non-transitory machine readable medium, executable by a processor to provide a graphical user interface that is operative to receive a selection of a location from a displayed map, provide a menu of options corresponding to a library of geo-fence shapes, and receive a selection of an option from the menu; a second set of instructions, stored in the non-transitory machine readable medium, executable by the processor to generate a geo-fence boundary around the selection using a geo-fence shape from the library corresponding to the option; and a third set of instructions, stored in the non-transitory machine readable medium, executable by the processor to determine compliance with the geo-fence boundary by communicating with a compliance-monitoring device.

In various examples, the communicating with the compliance-monitoring device includes transmitting the geo-fence boundary to the compliance-monitoring device and receiving movement information of the compliance-monitoring device with respect to the geo-fence boundary from the compliance-monitoring device. In some examples, the option corresponds to a location type. In a number of examples, the option is at least one of a bar or a liquor store. In various examples, the menu of options is populated according to restrictions on a person associated with the compliance-monitoring device. In various examples, the location corresponds to a mobile device.

In some examples, the compliance-control computer program product further includes a fourth set of instructions stored in the non-transitory machine readable medium. The fourth set of instructions is executable by the processor to receive an updated location for the mobile device and update the geo-fence boundary using the updated location.

In a number of embodiments, a computer-implemented method for compliance control includes displaying a map using a processing unit, receiving a selection from the map using the processing unit, using the processing unit to generate a geo-fence boundary around the selection using a geo-fence shape selected from a library of geo-fence shapes according to an entity type associated with the selection, and determining compliance with the geo-fence boundary by using the processing unit to communicate with a compliance-monitoring device.

In some examples, the map is displayed as part of a graphical user interface. In various examples, the entity type includes at least one of a bar, a liquor store, a dispensary, a gambling establishment, or a school. In a number of examples, determining the compliance includes receiving an indication that the compliance-monitoring device crossed the geo-fence boundary. In various examples, determining the compliance includes receiving an indication that the compliance-monitoring device has not crossed the geo-fence boundary. In some examples, the compliance-monitoring device is a smart phone.

In various embodiments, a method of onboarding a compliance-monitoring device in a compliance monitoring system includes configuring the compliance-monitoring device with an initial configuration where the compliance-monitoring device is set to monitor a first set of data and using an identifier for a specific offender to configure the compliance-monitoring device for the specific offender so that the compliance-monitoring device monitors a second set of data that is a subset of the first set of data. In some examples, using the identifier for the specific offender to configure the compliance-monitoring device is performed upon establishing a communication connection between the compliance monitoring system and the compliance-monitoring device. In a number of examples, the method further includes providing the identifier to the compliance-monitoring device via a QR code.

BRIEF DESCRIPTION OF THE DRAWINGS

The disclosure will be readily understood by the following detailed description in conjunction with the accompanying drawings, wherein like reference numerals designate like structural elements.

FIG. 3D depicts a third example of using the user interface of FIG. 3A for compliance control.

DETAILED DESCRIPTION

Figure 1:
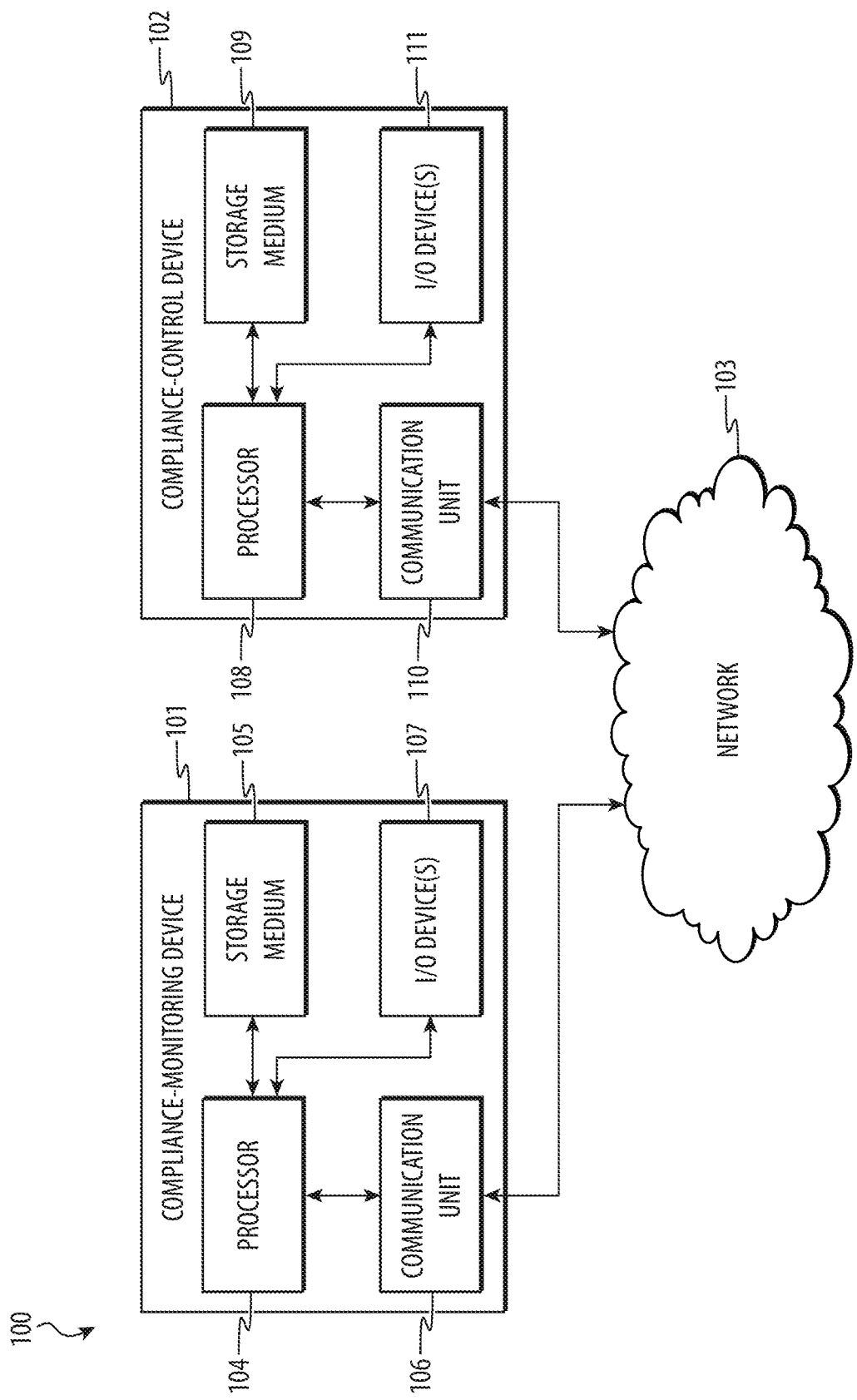
FIG. 1 depicts an example system for compliance control.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, apparatuses, and computer program products that embody various elements of the present disclosure. However, it should be understood that the described disclosure may be practiced in a variety of forms in addition to those described herein.

Traditional ankle monitors are a burdensome mechanism for evaluating compliance conditions for parole, probation, or similar programs. They are expensive, limited in function, noticeable, and challenging to implement. At the same time, traditional ankle monitors do not provide a great deal of capabilities, flexibility, and so on. They may only identify the location of a person presuming the identity of that person was correctly determined when the ankle monitor was attached, the ankle monitor has not been undetectably removed, and so on.

As described in more detail herein, a mobile device (such as a cellular telephone, a smart phone, a wearable device, a tablet computing device, and so on) may be configured as a compliance-monitoring device using software that controls and/or restricts access to various components and communicates with one or more other components in a system for compliance control, such as a compliance-control device. The compliance-monitoring device may use various components to verify a person's identity (such as by obtaining video or still images of the person, obtaining audio of the person, obtaining one or more logins/passwords/passkeys/etc. from the person, and so on), re-verify identity at various times (such as periodically, continuously, at random intervals, upon the occurrence of a condition, and so on), track the person's position (such as using a global positioning system, cellular network location, internet protocol location, and so on), evaluate the person's position with respect to one or more required/prohibited areas and/or times, communicate with the person, gather data regarding and/or evaluate the person's behavior, provide cognitive behavioral therapy, monitor and/or evaluate compliance conditions for one or more programs, and so on.

The compliance-monitoring device may monitor and/or report data in accordance with instructions provided to the system via one or more compliance-control devices. For example, a probation/parole or similar officer may use the compliance-control device to execute software in order to specify program conditions for one or more people, places where one or more people are required to be at one or more times, places where one or more people are not allowed to go, evaluate and/or monitor compliance conditions, gather data for evaluating and/or monitoring compliance conditions, trigger actions for noncompliant compliance conditions (such as providing one or more adverse recommendations to a court or other authority, censure to the person, cognitive behavioral therapies to the person, penalties to the person, law enforcement alerts regarding the person, and so on), communicate with the person, and so on.

For example, the compliance-control device may provide an interface that the probation/parole or similar officer may use to draw one or more geo-fence boundaries for the person. A geo-fence boundary may be a virtual perimeter, defined by a location technology (such as a global positioning system, radio frequency identification, and so on), that enables triggering of an action when a mobile device crosses the virtual perimeter (such as by entering, leaving, and so on).

By way of illustration, a parolee may participate in a parole program where the person agrees to abstain from liquor, avoid associating with people who have criminal records, avoid previous criminal victims, and so on in order to be released from incarceration in a prison or other facility. The parolee may be required to follow the program under penalty of being again incarcerated. As such, the parolee may carry a compliance-monitoring device that monitors the parolee's compliance conditions for the parole program and the parolee's parole officer may use a compliance-control device to configure conditions that the parolee is evaluated against to determine the parolee's compliance conditions. For example, the parole officer may draw geo-fence boundaries on a map interface provided by the compliance-control device around all of the locations that the parolee is prohibited from going, such as one or more bars, liquor stores, dispensaries, gambling venues, schools, homes of particular people, mobile devices of particular people, and so on.

However, the probation/parole or similar officer may find having to draw each and every geo-fence boundary for a person to be burdensome, complex, and time consuming. For example, the probation/parole or similar officer may want to draw geo-fence boundaries around a large number of different bars, liquor stores, dispensaries, schools, people, and so on for a particular person. Any number of these geo-fences may be similar, resulting in an extensive and highly repetitive task. Further, the system would consume hardware and software resources as part of the probation/parole or similar officer to draw each and every geo-fence boundary. Graphical resources may be inefficiently and duplicative used in presenting and updating an interface as the probation/parole or similar officer draws the repetitive and numerous geo-fence boundaries, storage resources may be inefficiently and duplicative used in receiving and storing input as the probation/parole or similar officer draws the repetitive and numerous geo-fence boundaries, processor resources may be inefficiently and duplicative used in interpreting input as the probation/parole or similar officer draws the repetitive and numerous geo-fence boundaries, network resources may be inefficiently and duplicative used in transmitting and/or receiving data as the probation/parole or similar officer draws the repetitive and numerous geo-fence boundaries, and so on.

Dynamic geo-fence generation, monitoring, and updating may enable a system to ameliorate these issues. The techniques discussed herein may enable the probation/parole or similar officer to create such geo-fences more efficiently with less burden and complexity. Further, this increase in efficiency may improve the system by enabling capabilities not previously performable and by conserving hardware and/or software system resources that are no longer required to be consumed by excess user interaction. As a result, hardware and/or software system performance may be improved.

Further, detection and reporting of compliance conditions may require software and/or hardware resources. More frequent detection and reporting may prevent fraud and enable quicker response to breaches, but may consume more software and/or hardware resources. Less frequent detection and reporting may consume less software and/or hardware resources, but may allow fraud and slow response to breaches. To balance these factors, compliance conditions may be monitored and reported on a first time interval until a breach is detected, whereupon compliance conditions may be reported on a second, shorter time interval. As a result, hardware and/or software system performance may be improved.

The following disclosure relates to a system that performs compliance control. This may include a compliance-control device displaying a map, receiving a selection of a location from the map, determining an entity associated with the selection, generating a geo-fence boundary around the selection using a library of geo-fence shapes, and determining a compliance condition with the geo-fence boundary by communicating with a compliance-monitoring device. In some examples, the location may correspond to the compliance-monitoring device and the geo-fence boundary may be updated according to movement of the compliance-monitoring device. In various examples, the geo-fence boundary may be transmitted to the compliance-monitoring device and the compliance condition may be determined according to information received from the compliance-monitoring device regarding whether or not the compliance-monitoring device is within the geo-fence boundary. In various examples, the compliance-monitoring device may determine and transmit a compliance condition on a first time interval. In response to a breach event, the compliance-monitoring device may determine and transmit a set of subsequent compliance conditions on a second time interval that is shorter than the first time interval. The compliance-control device may display a graphical output that corresponds to the compliance condition and one or more of the subsequent compliance conditions. In this way, software and/or hardware resources can be conserved with less frequent compliance condition monitoring in the absence of a breach event, balanced with targeted increased resource consumption in response to detected breach.

These and other embodiments are discussed below with reference to FIGS. 1-7. However, those skilled in the art will readily appreciate that the detailed description given herein with respect to these Figures is for explanatory purposes only and should not be construed as limiting.

FIG. 1 depicts an example system 100 for compliance control. The system 100 may include one or more compliance-monitoring devices 101 and one or more compliance-control devices 102 that may be operable to communicate via one or more communication networks 103.

The compliance-monitoring device 101 may include software that controls and/or restricts access to various components and communicates with the compliance-control device 102 and/or one or more other system 100 components for compliance control. For example, the compliance-monitoring device 101 may use various components to verify a person's identity (such as by obtaining video or still images of the person, obtaining audio of the person, obtaining one or more logins/passwords/passkeys/etc. from the person, and so on), re-verify identity at various times (such as periodically, continuously, at random intervals, upon the occurrence of a condition, and so on), track the person's position (such as using a global positioning system, cellular network location, internet protocol location, and so on), evaluate the person's position with respect to one or more required/prohibited areas and/or times, communicate with the person, gather data regarding and/or evaluate the person's behavior, provide cognitive behavioral therapy, monitor and/or evaluate compliance with one or more programs, and so on.

The compliance-monitoring device 101 may monitor and/or report data in accordance with instructions provided to the system 100 via the compliance-control device 102. For example, a probation/parole or similar officer may use the compliance-control device 102 to execute software in order to specify program conditions for one or more people, places where one or more people are required to be at one or more times, places where one or more people are not allowed to go, evaluate and/or monitor compliance conditions, gather data for evaluating and/or monitoring compliance conditions, trigger actions for compliance conditions determined to be noncompliant (such as providing one or more adverse recommendations to a court or other authority, censure to the person, cognitive behavioral therapies to the person, penalties to the person, law enforcement alerts regarding the person, and so on), communicate with the person, and so on.

For example, the compliance-control device 102 may provide an interface (such as a graphical user interface) that the probation/parole or similar officer may use to draw one or more geo-fence boundaries for the person. The geo-fence boundary may be a virtual perimeter, defined by a location technology (such as a global positioning system, radio frequency identification, and so on), that enables triggering of an action when a mobile device crosses the virtual perimeter (such as by entering, leaving, and so on).

By way of illustration, a parolee may participate in a parole program where the person agrees to abstain from liquor, avoid associating with people who have criminal records, avoid previous criminal victims, and so on in order to be released from incarceration in a prison or other facility. The parolee may be required to follow the program under penalty of being again incarcerated. As such, the parolee may carry the compliance-monitoring device 101 that monitors the parolee's compliance conditions with respect the parole program and the parolee's parole officer may use the compliance-control device 102 to configure conditions that the parolee's compliance conditions are evaluated against. For example, the parole officer may draw geo-fence boundaries on a map interface provided by the compliance-control device 102 around all of the locations that the parolee is prohibited from going, such as one or more bars, liquor stores, dispensaries, gambling venues, schools, homes of particular people, mobile devices of particular people, and so on.

In some examples, the compliance-control device 102 may display a map, receive a selection of a location from the map, determine an entity associated with the selection, generate a geo-fence boundary around the selection using a library of geo-fence shapes, and determine compliance with the geo-fence boundary by communicating with the compliance-monitoring device 101. The map may be presented as part of presenting a user interface. The library of geo-fence shapes may include a variety of geometric (such as a square, triangle, rectangle, octagon, and/or other polygonal and/or other geometric shape) and/or non-geometric shapes of different sizes that correspond to different types of business and/or other entities for which geo-fences may be created. The different shapes may be selected from among according to the entity corresponding to a selection, a selection from a menu of shapes presented to a user (or a "shape menu"), a selection from a menu of entity types presented to a user (which may be populated according to restrictions on a person associated with the compliance-monitoring device 101, such as a person prohibited from entering a bar or liquor store, a person prohibited from being within a specified distance of a school, and so on), and so on.

For example, a geo-fence boundary for a bar may be configured as a square that is estimated to surround a building corresponding to an address of a selected location so that a person cannot go inside. By way of another example, a geo-fence boundary for a liquor store may be configured as a circle that is estimated to widely surround a building corresponding to an address of a selected location so that a person can neither go inside nor wait nearby in an attempt to convince others to go in for him. In yet another example, a geo-fence boundary for a prohibited person (such as the object of a restraining order associated with a person) may be configured as an octagon that is estimated to provide a specified distance of separation (such as 100 feet in any direction, 100 yards in any direction, and so on) from the prohibited person (which may be calculated from the prohibited person's home, workplace, associated mobile device and configured to move with the associated mobile device, and so on).

In other examples, the compliance-control device 102 may provide an interface where a user may be able to indicate types of businesses and/or other entities for which to generate one or more geo-fence boundaries for an offender or other monitored person. A POI (points of interest) database (such as the Google™ POI database) or other data store may be queried according to the types indicated and the POI database may return locations and/or names of businesses and/or other entities corresponding to the indicated types within an area (such as within the same city as the compliance-monitoring device 101, within 5 miles of the compliance-monitoring device 101, and so on). One or more geo-fence boundaries may be generated using the returned information. In some implementations, different geo-fence boundaries may be generated using the returned information for different types of business and/or other entities using geo-fence shapes that correspond to the types from a library of geo-fence shapes. One or more of these geo-fence boundaries may then be sent to the compliance-monitoring device 101.

In some examples, the compliance-control device 102 may receive positional information from the compliance-monitoring device 101 and use such information to determine compliance conditions with respect to the geo-fence boundary. However, in some implementations, this could allow the geo-fence boundary to be crossed before the information can be reported to the compliance-control device 102 and used to determine a noncompliant compliance condition. However, in a number of other examples, the compliance-control device 102 may transmit the geo-fence boundary to the compliance-monitoring device 101 and may determine compliance conditions based on compliance information from the compliance-monitoring device 101. For example, the compliance-monitoring device 101 may monitor its position with respect to the geo-fence boundary and transmit such information to the compliance-control device 102. In such an example, a noncompliant compliance condition may be detected and acted upon even before reported to the compliance-control device 102, though such information and/or other information may still be periodically and/or otherwise reported at various regular and/or irregular intervals.

For example, the compliance-monitoring device 101 may determine and transmit a compliance condition on a first time interval. In response to a breach event, the compliance-monitoring device 101 may determine and transmit a set of subsequent compliance conditions on a second time interval that is shorter than the first time interval. For example, the first time interval may be a time interval that is less than 5 minutes. In some cases, the first time interval is less than 3 minutes. The first time interval may be less than 1 minute. The first time interval may be less than 30 seconds. With respect to any of the previous examples time ranges, the first time interval may be greater than the second time interval and may also be greater than 1 second, greater than 5 seconds, greater than 10 seconds, greater than 30 seconds, or greater than 1 minute. The second time interval is typically shorter than the first time interval and may be greater than 50 milliseconds, greater than 1 second, greater than 10 seconds, greater than 30 seconds, or greater than 1 minute. The compliance-control device 102 may display a graphical output that corresponds to the compliance condition and one or more of the subsequent compliance conditions.

In various examples, the compliance-control device 102 may execute instructions stored in a non-transitory machine readable medium to provide a graphical user interface that is operative to receive a selection of a location from a displayed map, provide a menu of options corresponding to a library of geo-fence shapes, and receive a selection of an option from the menu; generate a geo-fence boundary around the selection using a geo-fence shape from the library corresponding to the option; and determine a compliance condition with respect to the geo-fence boundary by communicating with a compliance-monitoring device. Alternatively, the graphical user interface may be provided via a cloud-based and/or software as a service network-based application accessible that may be accessed through a client application or service executed on the compliance-control device 102.

In a number of examples, the compliance-control device 102 may perform a method including displaying a map using a processing unit, receiving a selection from the map using the processing unit, using the processing unit to generate a geo-fence boundary around the selection using a geo-fence shape selected from a library of geo-fence shapes according to an entity type associated with the selection, and determining a compliance condition with respect to the geo-fence boundary by using the processing unit to communicate with a compliance-monitoring device.

The compliance-control device 102 may be any kind of electronic device. Examples of such devices include, but are not limited to, one or more desktop computing devices, laptop computing devices, mobile computing devices, wearable devices, tablet computing devices, mobile telephones, smart phones, digital media players, and so on. In some examples, the compliance-control device 102 be a dedicated device that provides access to tracking functionality as discussed herein but may have restricted access to one or more operating systems of the compliance-control device 102 and/or other non-tracking functionality. The compliance-control device 102 may include one or more processors 108 and/or other processing units and/or controllers, one or more non-transitory storage media 109 (which may take the form of, but is not limited to, a magnetic storage medium; optical storage medium; magneto-optical storage medium; read only memory; random access memory; erasable programmable memory; flash memory; and so on), one or more communication units 110, one or more input/output components 111 (including, but not limited to, one or more displays, still image and/or video cameras, biometric reader devices, touch screens, printers, microphones, speakers, keyboards, computer mice, track pads, and so on), and/or other components. The processor 108 may execute one or more sets of instructions stored in the non-transitory storage media 109 to perform various functions, such as presenting one or more maps or other user interfaces, receiving user input, generating one or more geo-fence boundaries, accessing and/or maintaining a library of geo-fence shapes, determining entities associated with selections, communicating with the compliance-monitoring device 101 via the network 103 using the communication unit 110, and so on.

Similarly, the compliance-monitoring device 101 may be any kind of electronic device. Examples of such devices include, but are not limited to, one or more desktop computing devices, laptop computing devices, mobile computing devices, wearable devices, tablet computing devices, mobile telephones, smart phones, digital media players, and so on. In some examples, the compliance-monitoring device 101 be a dedicated device that provides access to tracking functionality as discussed herein but may have restricted access to one or more operating systems of the compliance-monitoring device 101 and/or other non-tracking functionality. The compliance-monitoring device 101 may include one or more processors 104 and/or other processing units and/or controllers, one or more non-transitory storage media 105 (which may take the form of, but is not limited to, a magnetic storage medium; optical storage medium; magneto-optical storage medium; read only memory; random access memory; erasable programmable memory; flash memory; and so on), one or more communication units 106, one or more input/output components 107 (including, but not limited to, one or more displays, still image and/or video cameras, biometric reader devices, touch screens, printers, microphones, speakers, keyboards, computer mice, track pads, facial recognition sensors and/or fingerprint sensors and/or any other sensors that may be used to authenticate and/or identify one or more users, and so on), and/or other components. The processor 104 may execute one or more sets of instructions stored in the non-transitory storage media 105 to perform various functions, such as determining and/or reporting position, presenting output, receiving user input, reporting position, verifying identity, communicating with the compliance-control device 102 via the network 103 using the communication unit 106, and so on. Alternatively, such functions may be provided via a cloud-based and/or software as a service network-based application accessible that may be accessed through the compliance-monitoring device 101.

Although the system 100 is illustrated and described as including particular components that perform particular functions, it is understood that this is an example. In other implementations, other components may be used and/or the components illustrated may perform different functions without departing from the scope of the present disclosure.

For example, the compliance-control device 102 is illustrated and described as a single electronic device. However, in various implementations, the compliance-control device 102 may be implemented using one or more devices, as part of a cloud-computing arrangement, and so on. Various configurations are possible and contemplated without departing from the scope of the present disclosure.

By way of another example, in some implementations, the system 100 may include a mobile device or other device carried by and/or otherwise associated with a prohibited or other person. The compliance-control device 102 may monitor the location of the mobile device in order to determine one or more compliance conditions and/or to ensure that the compliance-monitoring device 101 stays outside of a geo-fence boundary and/or other boundary associated with the mobile device. Various configurations are possible and contemplated without departing from the scope of the preset disclosure.

The compliance-monitoring device 101 may be prepared to interact with the system 100 in a variety of different ways. For example, in one or more examples of onboarding the compliance-monitoring device 101 to participate in a compliance monitoring system, the compliance-monitoring device 101 may be one of a group of electronic devices that are generally configured to interact with the system 100 as part of a compliance monitoring program. Each of the group of electronic devices may be assigned to one of a group of offenders and/or other monitored people and then specifically configured for the respective offender and/or other monitored person.

For example, an identifier (such as a number) associated with a specific offender and/or other monitored person may be provided to the compliance-monitoring device 101. In some examples, the compliance-monitoring device 101 may obtain the identifier by scanning a QR code or other 2D and/or 3D barcode. The compliance-monitoring device 101 may then communicate with the system 100 in order to configure the compliance-monitoring device 101 specifically for the specific offender.

In some implementations, the compliance-monitoring device 101 may be configured with an initial configuration that monitors a larger set of information than the compliance-monitoring device 101 monitors after being configured for the specific offender. For example, the compliance-monitoring device 101 may monitor all configured geo-fence boundaries and log all incoming and/or outgoing communications whereas after configuration for the specific offender the compliance-monitoring device 101 monitors a subset of the geo-fence boundaries linked to the specific offender and logs text messages to and/or from a particular number. In this way, the compliance-monitoring device 101 may be initially configured and assigned in a situation where the compliance-monitoring device 101 may not be able to communicate with the system 100 (such as where cellular reception and/or WiFi and/or wireless data coverage is lacking and/or insufficient) and later configured with the compliance-monitoring device 101 is able to communicate with the system 100 without sacrificing the ability to log relevant data. Various configurations are possible and contemplated without departing from the present disclosure.

In some examples, the compliance-monitoring device 101 may be configured to determine and transmit a compliance condition on a first time interval. In response to a breach event, the compliance-monitoring device 101 may be configured to determine and transmit a set of subsequent compliance conditions on a second time interval that is shorter than the first time interval. For example, the first time interval may be a time interval that is less than 5 minutes. In some cases, the first time interval is less than 3 minutes. The first time interval may be less than 1 minute. The first time interval may be less than 30 seconds. With respect to any of the previous examples time ranges, the first time interval may be greater than the second time interval and may also be greater than 1 second, greater than 5 seconds, greater than 10 seconds, greater than 30 seconds, or greater than 1 minute. The second time interval is typically shorter than the first time interval and may be greater than 50 milliseconds, greater than 1 second, greater than 10 seconds, greater than 30 seconds, or greater than 1 minute.

Figure 2:
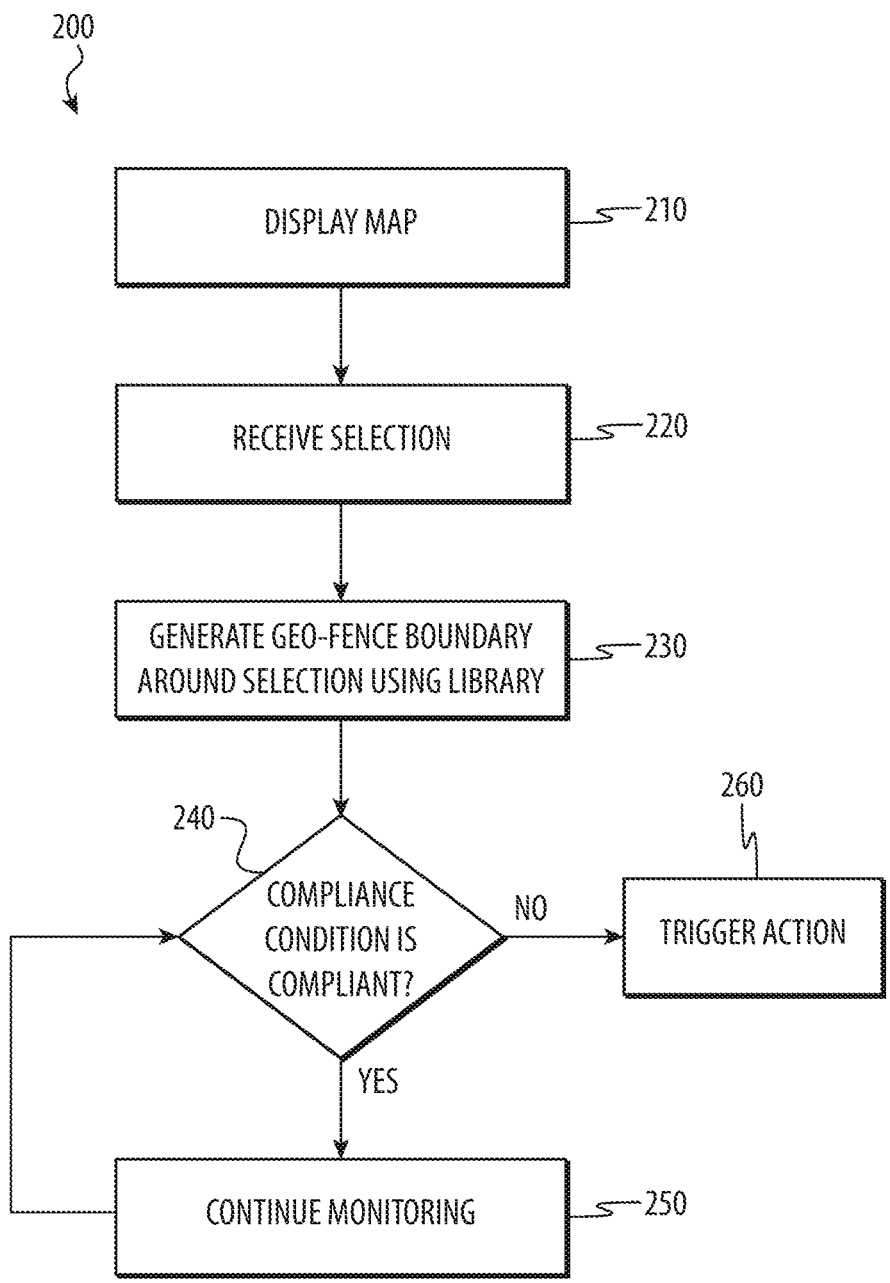
FIG. 2 depicts a flow chart illustrating a first example method for compliance control. This method may be performed by the system of FIG. 1.

FIG. 2 depicts a flow chart illustrating a first example method 200 for compliance control. This method 200 may be performed by the system 100 of FIG. 1.

At operation 210, an electronic device (such as the compliance-control device 102 of FIG. 1) may display and/or otherwise present a map. At operation 220, the electronic device may receive a selection (such as a selection of a location on the map) is received. By way of illustration, the location on the map may be a bar, a liquor store, a gambling establishment, a dispensary, and so on. At operation 230 the electronic device may generate one or more geo-fence boundaries around the selection. For example, the selection may correspond to a business and a geo-fence boundary may be generated by matching a pre-stored shape associated with a predicted geographic area associated with businesses of that type. The flow may then proceed to operation 240.

At operation 240, the electronic device may determine a compliance condition with respect to the geo-fence boundary. If the compliance condition is compliant (such as if the electronic device is not positioned within the geo-fence boundary), the flow may proceed to operation 250 where the electronic device may continue monitoring before the flow returns to operation 240 and the compliance condition is again determined. Otherwise, if the compliance condition is noncompliant (such as if the electronic device is positioned within the geo-fence boundary), the flow may proceed to operation 260 where the electronic device may trigger an action. Such actions may include, but are not limited to, providing one or more adverse recommendations to a court or other authority, censure to the person, cognitive behavioral therapies to the person, penalties to the person, law enforcement alerts regarding the person, and so on.

For example, in various implementations, one or more geo-fence boundaries may be generated and transmitted to a compliance-monitoring device. In some cases, the transmitted geo-fence boundaries may be those determined to be within an area of a location of the compliance-monitoring device (such as within one mile, within a city, and so on determined based on a global positioning system determined or other determined location of the compliance-monitoring device). The compliance-monitoring device may determine its location at various intervals and compare its dynamically determined current location to the transmitted geo-fence boundaries to determine a compliance condition (such as identifying the geo-fence boundary with the smallest distance to the compliance-monitoring device and whether or not the current location of the compliance-monitoring device is within the identified geo-fence boundary to determine whether or not a breach event has occurred). The compliance-monitoring device may record one or more breach events related to determining that the compliance condition is not compliant in a compliance log and transmit the compliance log to a monitor service. The compliance-monitoring device may transmit the compliance log less frequently than the compliance-monitoring device determines compliance conditions. The compliance-monitoring device may also be caused to display one or more alerts in response to one or more breach events.

In a number of examples, a compliance-monitoring device may be configured to determine compliance conditions by evaluating whether or not the compliance-monitoring device is within one or more monitored geo-fence boundaries at a first time interval, such as every 5 seconds, thirty seconds, one minute, or other interval. Upon determining that the compliance condition is not compliant, such as by detecting that the compliance-monitoring device is within such a monitored geo-fence boundary or other breach event, the compliance-monitoring device may be configured to provide an alert (such as an audio tone and a visual warning) warning of the lack of compliance with the geo-fence boundary. The non-compliance may also be logged in a compliance log. This may allow a person to leave an area in order to maintain compliance. The compliance-monitoring device may be configured to determine the compliance condition again. In some examples, the compliance-monitoring device may respond to a breach by determining subsequent compliance conditions at a second time interval that is shorter than the first time interval. In other examples, the compliance-monitoring device may continue using the first time interval after detecting a breach. The compliance-monitoring device may be configured to provide the alert a set number of times if non-compliance is maintained, such three times if non-compliance is repeated. After the set number of times, the alert may no longer be provided. Instead, an alternate alert (such as bringing to the foreground and flashing a screen warning of non-compliance) may be provided less frequently than the alert, such as once a minute. If a noncompliant compliance condition is determined more than a threshold number of times, such as the set number of times, the compliance log may be reported. The compliance log may be reported at a third time interval that is greater than the first time interval and/or the second time interval. In a number of implementations, the order of these operations and the times and/or options involved may be configurable. In some implementations, the intervals may be throttled (such as changing the third time interval from one minute to fifteen minutes in situations where network traffic is high and/or where a noncompliant compliance condition has not been recently detected). Various configurations are possible and contemplated without departing from the scope of the present disclosure.

In various examples, this example method 200 may be implemented as a group of interrelated software modules or components that perform various functions discussed herein. These software modules or components may be executed within a cloud network and/or by one or more computing devices, such as the compliance-control device 102 and/or the compliance-monitoring device 101 of FIG. 1.

Although the example method 200 is illustrated and described as including particular operations performed in a particular order, it is understood that this is an example. In various implementations, various orders of the same, similar, and/or different operations may be performed without departing from the scope of the present disclosure.

For example, the method 200 is illustrated and described as receiving selections associated with a map. However, it is understood that this is an example. In various implementations, user interfaces other than a map may be used. Various configurations are possible and contemplated without departing from the scope of the present disclosure.

By way of another example, the method 200 is illustrated and described as generating one geo-fence boundary and then determining compliance. However, it is understood that this is an example. In a number of implementations, any number of geo-fence boundaries may be generated and compliance with such geo-fence boundaries may be evaluated and/or monitored in any number of different orders. Various configurations are possible and contemplated without departing from the scope of the present disclosure.

Figure 3A:
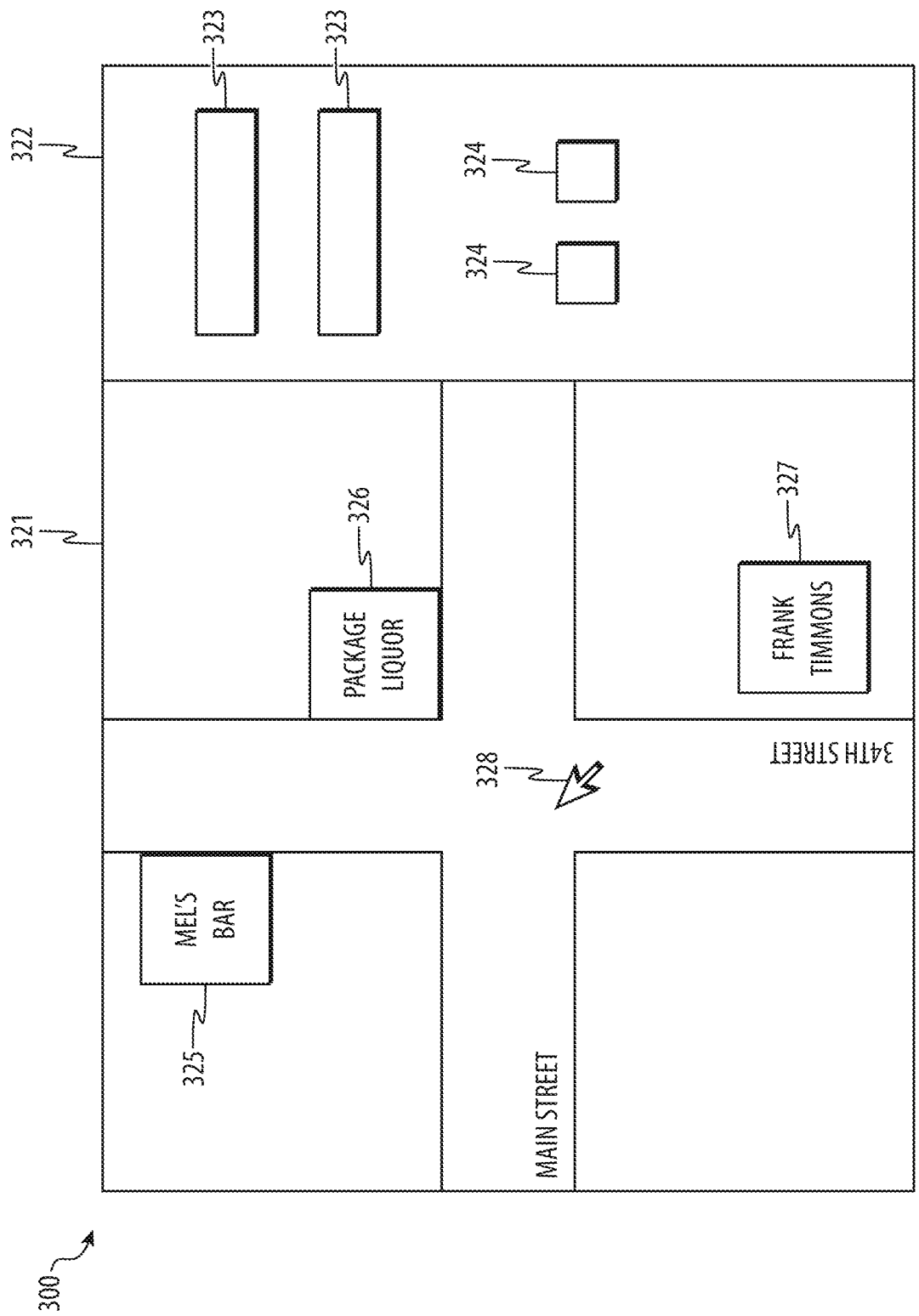
FIG. 3A depicts an example user interface for compliance control.

FIG. 3A depicts an example user interface 300 for compliance control. The user interface 300 may include a graphical user interface portion 321 and a control user interface portion 322. The graphical user interface portion 321 may be implemented as a map with one or more locations 325, 326, 327 that are selectable with a cursor arrow 328. The control user interface portion 322 may include one or more text boxes 323, buttons 324, and/or other controls. The graphical user interface portion 321 and/or the control user interface portion 322 may be operable to receive user input for selecting one or more geo-fence boundaries and/or otherwise controlling and/or interacting with a system for compliance control.

For example, the cursor arrow 328 may be used to select one or more locations 325, 326, 327. In response, one or more geo-fence boundaries may be generated around the selection using a library of geo-fence shapes.

Figure 3B:
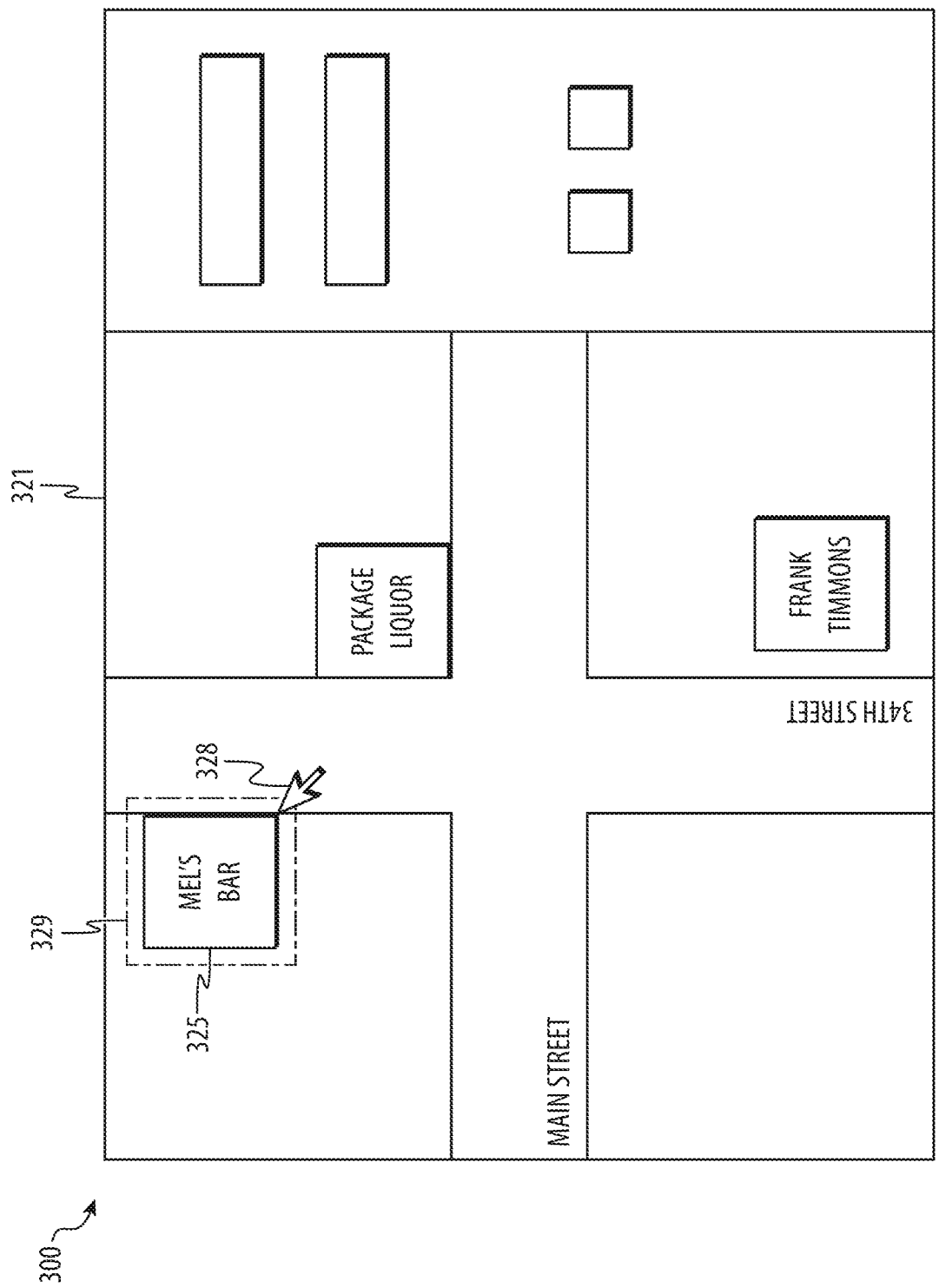
FIG. 3B depicts a first example of using the user interface of FIG. 3A for compliance control.

FIG. 3B depicts a first example of using the user interface of FIG. 3A for compliance control. As shown, the cursor arrow 328 is used to select the location 325. In response, a geo-fence boundary 329 may be created around the selection. The geo-fence boundary 329 may be configured as a square that is estimated to surround a bar corresponding to an address of the selected location so that a person cannot go inside.

Figure 3C:
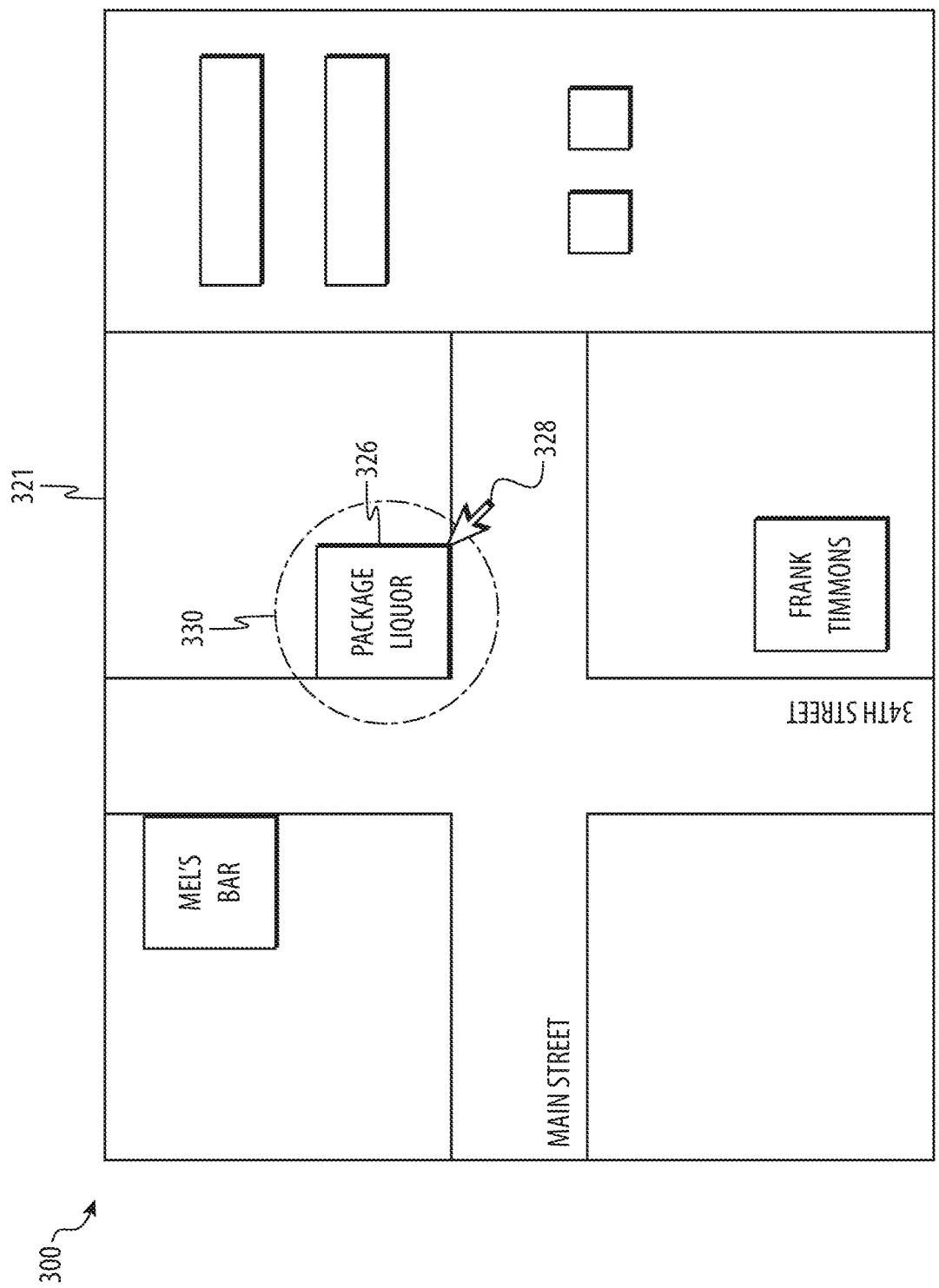
FIG. 3C depicts a second example of using the user interface of FIG. 3A for compliance control.

FIG. 3C depicts a second example of using the user interface of FIG. 3A for compliance control. As shown, the cursor arrow 328 is used to select the location 326. In response, a geo-fence boundary 330 may be created around the selection. The geo-fence boundary 330 may be configured as a circle that is estimated to widely surround a liquor store corresponding to an address of the selected location so that a person can neither go inside nor wait nearby in an attempt to convince others to go in for him.

FIG. 3D depicts a third example of using the user interface of FIG. 3A for compliance control. As shown, the cursor arrow 328 is used to select the location 327. In response, a geo-fence boundary 331 may be created around the selection. The geo-fence boundary 331 may be configured as an octagon that is estimated to provide a specified distance of separation (such as 100 feet in any direction, 100 yards in any direction, and so on) from a prohibited person (such as a previous criminal cohort) with whom a person is not allowed to have contact. The specified distance of separation may be calculated from the prohibited person's home, workplace, associated mobile device and configured to move with the associated mobile device, and so on.

The geo-fence boundaries 329-331 may be selected from the library of geo-fence shapes in a variety of different ways. For example, the geo-fence boundary 329 may be selected from the library of geo-fence shapes in FIG. 3B because the location 325 is a bar, the geo-fence boundary 330 may be selected from the library of geo-fence shapes in FIG. 3C because the location 326 is a liquor store, and the geo-fence boundary 331 may be selected from the library of geo-fence shapes in FIG. 3D because the location 327 is a prohibited person. However, in other examples, the respective geo-fence boundaries may be selected from the library of geo-fence shapes using a menu of entity or location types, a menu of shape types, and/or other menus. Various configurations are possible and contemplated without departing from the scope of the present disclosure.

Figure 3E:
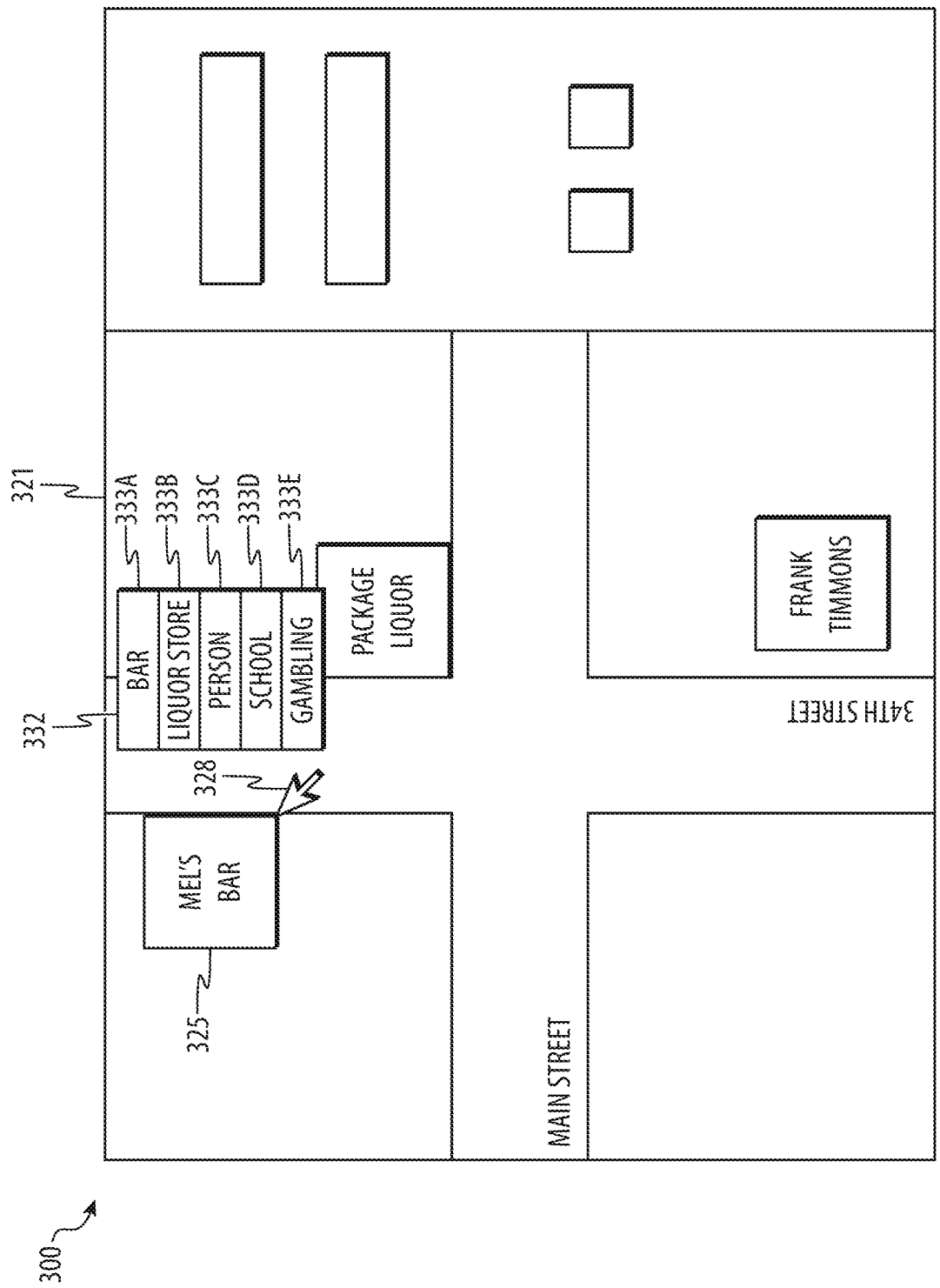
FIG. 3E depicts a fourth example of using the user interface of FIG. 3A for compliance control.

For example, FIG. 3E depicts a fourth example of using the user interface of FIG. 3A for compliance control. In this example, selection of the location 325 using the cursor arrow 328 may generate a menu 332. The menu 332 may include options 333A-333E that correspond to different types of locations for which there is an associated geo-fence shape in the library of geo-fence shapes. In this example, there may be different geo-fence shapes in the library for each of the options 333A (bar), 333B (liquor store), 333C (person), 333D (school), and 333E (gambling) (though any number of different options corresponding to any number of different location types may be used without departing from the scope of the present disclosure). Each option 333A-333E may correspond to a geo-fence shape in the library with a different shape and/or size and/or other property. Various configurations are possible and contemplated without departing from the scope of the present disclosure. In this example, use of the cursor arrow 328 to select the option 333A may generate the geo-fence boundary 329 in FIG. 3B.

Figure 3F:
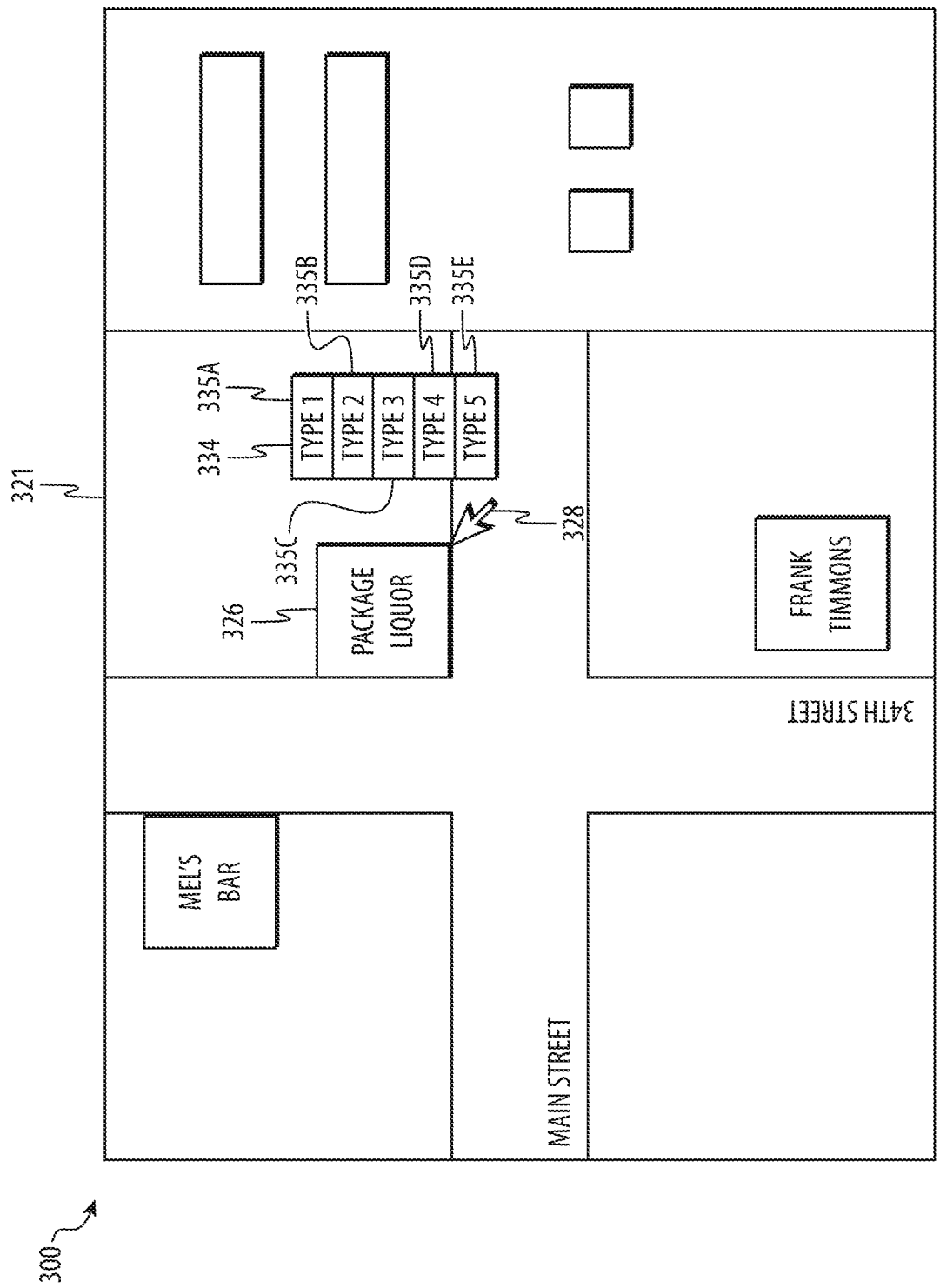
FIG. 3F depicts a fifth example of using the user interface of FIG. 3A for compliance control.

By way of another example, FIG. 3F depicts a fifth example of using the user interface of FIG. 3A for compliance control. In this example, selection of the location 326 using the cursor arrow 328 may generate a menu 334. The menu 334 may include options 335A-335E (though any number of different options may be used without departing from the scope of the present disclosure) that correspond to different types of geo-fence shapes in the library. In this example, there may be different geo-fence shapes in the library for each of the options 335A-335E that may each have a different shape and/or size and/or other property. Various configurations are possible and contemplated without departing from the scope of the present disclosure. In this example, use of the cursor arrow 328 to select the option 333B may generate the geo-fence boundary 330 in FIG. 3C.

Figure 3G:
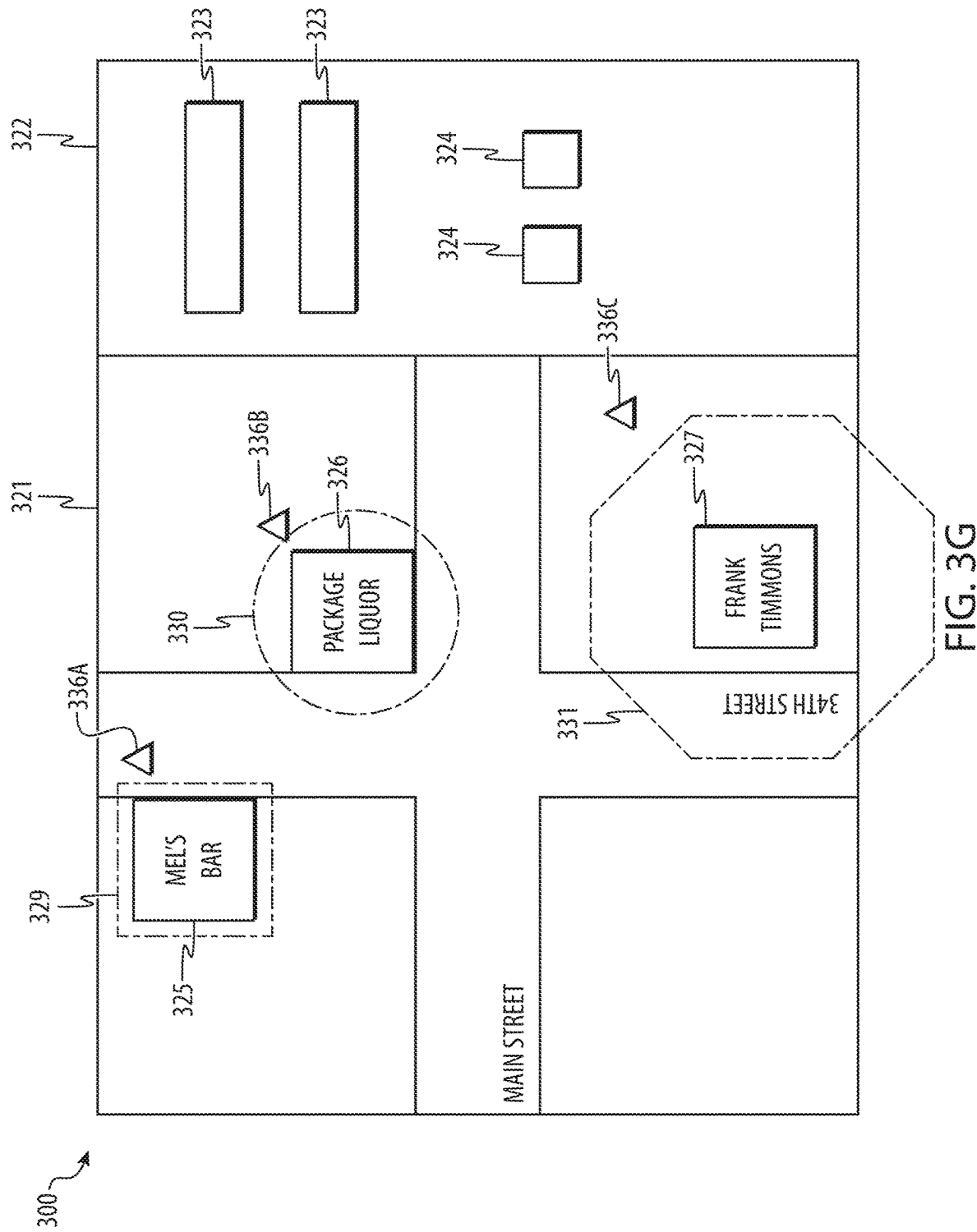
FIG. 3G depicts a sixth example of using the interface of FIG. 3A for compliance control.

FIG. 3G depicts a sixth example of using the interface of FIG. 3A for compliance control. In this example, the geo-fence boundaries 329-331 have been generated for one or more monitored people 336A-336C. As such, the interface may be used to view and monitor where the monitored people 336A-336C are with respect to their respective geo-fence boundaries 329-331 in order to monitor compliance.

Figure 3H:
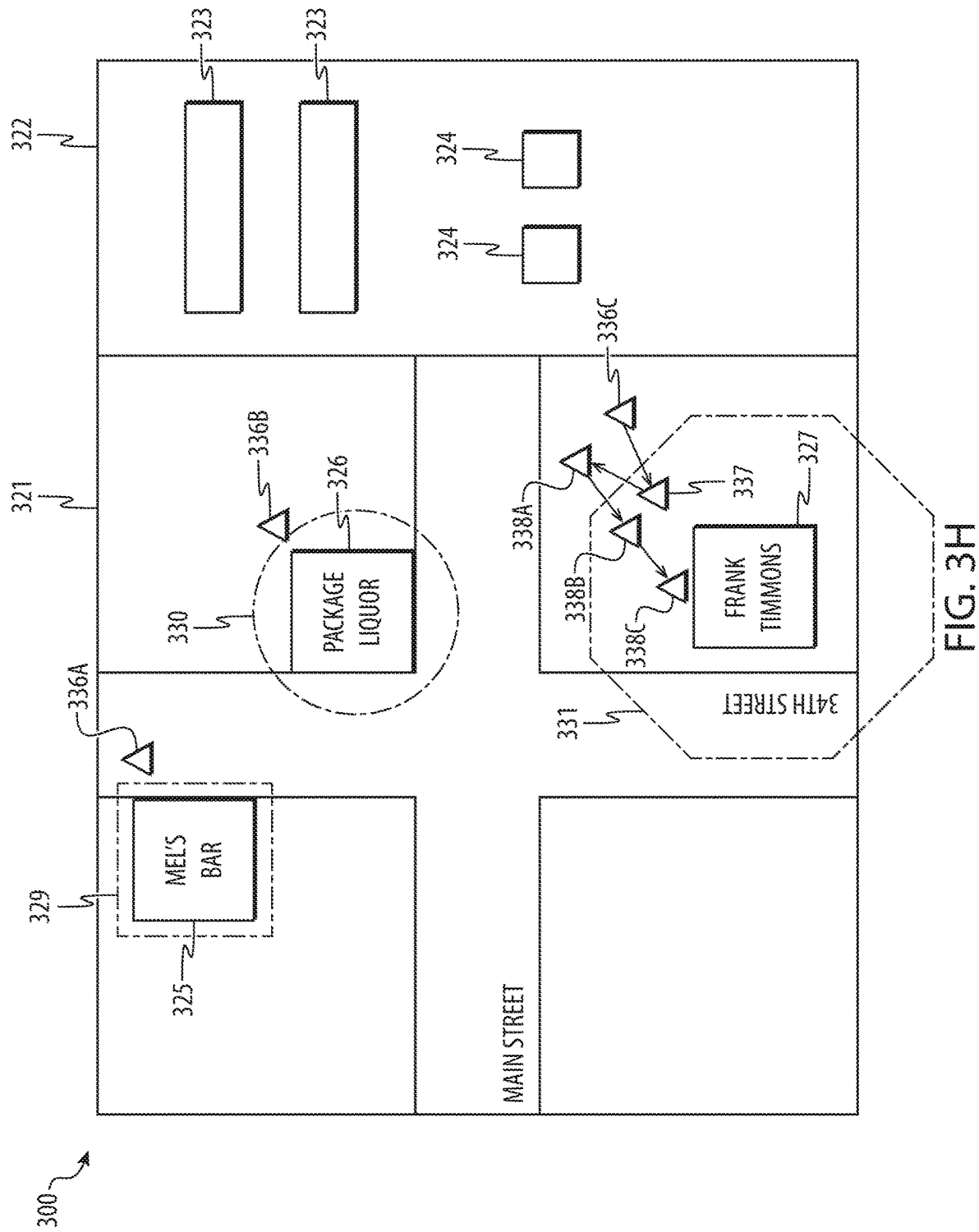
FIG. 3H depicts a seventh example of using the interface of FIG. 3A for compliance control.

FIG. 3H depicts a seventh example of using the interface of FIG. 3A for compliance control. In this example, similar to FIG. 3G, the geo-fence boundaries 329-331 have been generated for one or more monitored people 336A-336C. Compliance conditions for the monitored person 336C may be determined at a first time interval, such as every thirty seconds (or another appropriate interval, as described herein). However, after one such time interval, the compliance condition may be determined showing that the monitored person 336C has moved to a location 337 within the geo-fence boundary 331. This may be associated with a breach of a term of the monitored person's release, which may be detected by the system. In response to detecting the breach event, a set of subsequent compliance conditions 338A-338C may be determined at a second time interval that is shorter than the first time interval, such as every ten seconds (or another appropriate interval, as described herein). These subsequent compliance conditions 338A-338C may be graphically displayed with the compliance condition to show that the monitored person 336C moved within the geo-fence boundary 331, moved outside the geo-fence boundary 331 again, and then returned within to geo-fence boundary 331 to steadily approach the prohibited location.

In some examples, the interface may be used to create and monitor one or more geo-fence boundaries for a single monitored person. In other examples, the interface may be used to generate and/or monitor one or more geo-fence boundaries for one or more people. Various configurations are possible and contemplated without departing from the scope of the present disclosure.

Although FIGS. 3A-3H illustrate and describe generation of geo-fence boundaries in response to individual selections of locations on a map or other graphical user interface, it is understood that these are examples. In various implementations, other approaches are possible and contemplated without departing from the scope of the present disclosure.

For example, a user may be able to use an interface to indicate types of businesses and/or other entities for which to generate one or more geo-fence boundaries for an offender or other monitored person. In some implementations, the indication of these types may be provided by checking and/or unchecking one or more checkboxes for the individual types, radio buttons, and/or using other interfaces. A POI (points of interest) database (such as the Google™ POI database) or other data store may be queried according to the types indicated and the POI database may return locations and/or names of businesses and/or other entities corresponding to the indicated types within an area (such as within the same city as an offender or other monitored person, within 5 miles of the offender or other monitored person, and so on). One or more geo-fence boundaries may be generated using the returned information. In some implementations, different geo-fence boundaries may be generated using the returned information for different types of business and/or other entities using geo-fence shapes that correspond to the types from a library of geo-fence shapes. One or more of these geo-fence boundaries may then be sent to a compliance-monitoring device and/or monitored for compliance. Various configurations are possible and contemplated without departing from the scope of the present disclosure.

Figure 4:
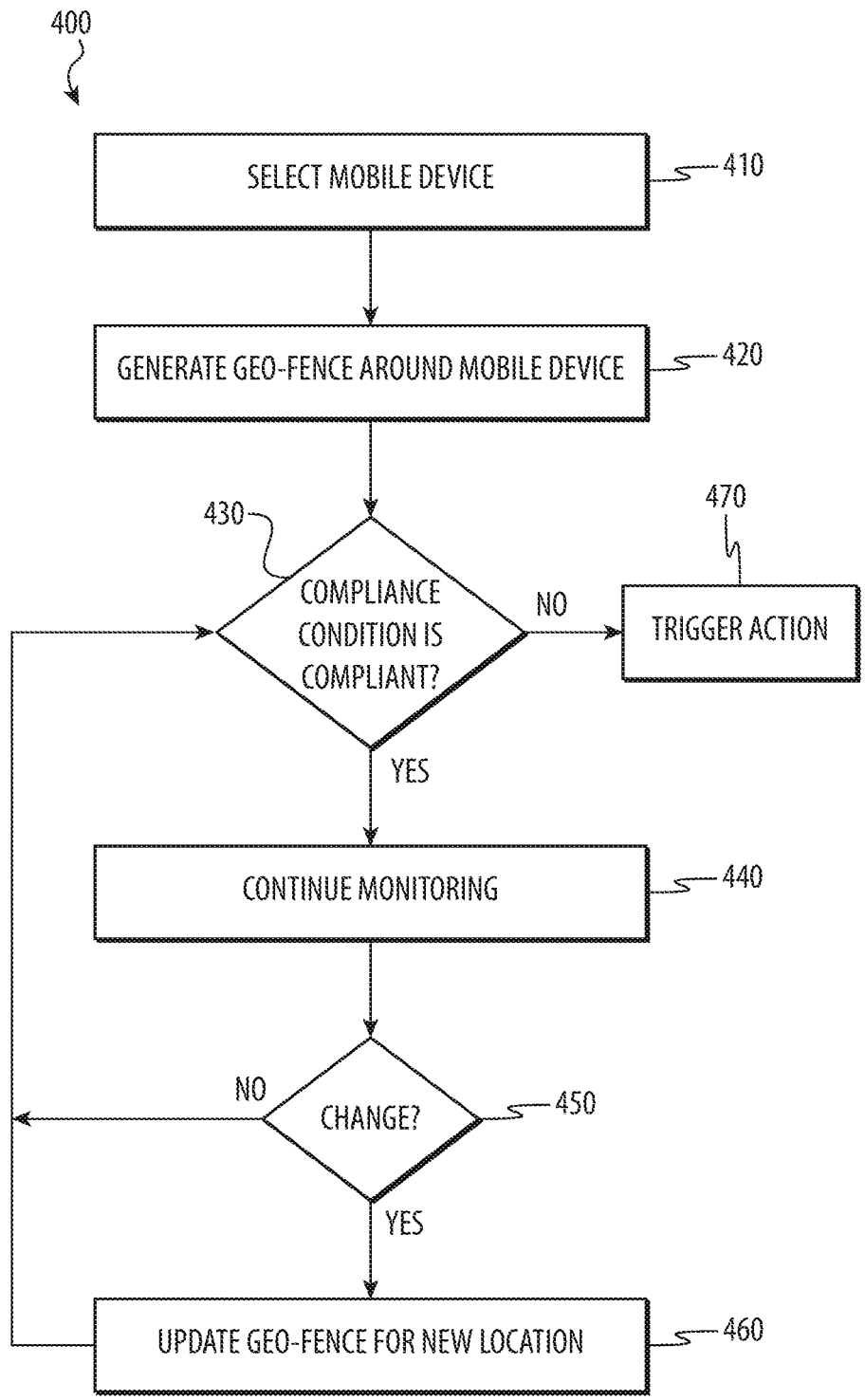
FIG. 4 depicts a flow chart illustrating a second example method for compliance control. This method may be performed by the system of FIG. 1.

FIG. 4 depicts a flow chart illustrating a second example method 400 for compliance control. This method 400 may be performed by the system 100 of FIG. 1.

At operation 410, an electronic device (such as the compliance-control device 102 of FIG. 1) may select a mobile device. At operation 420, a geo-fence boundary may be generated around the mobile device.

For example, the electronic device may present a user interface where a mobile device associated with the object of a restraining order may be selected and a geo-fence boundary may be generated around the mobile device. Such a geo-fence boundary may prohibit the subject of the restraining order within a specified distance of the object.

At operation 430, the electronic device may determine a compliance condition with respect to the geo-fence boundary. If the compliance condition is compliant, the flow may proceed to operation 440. Otherwise, the flow may proceed to operation 470 where the electronic device may trigger an action. Such actions may include, but are not limited to, providing one or more adverse recommendations to a court or other authority, censure to the person, cognitive behavioral therapies to the person, penalties to the person, law enforcement alerts regarding the person, determining compliance conditions on a more frequent time interval (such as where compliance conditions were previously determined on a first time interval and afterward a set of subsequent compliance conditions are determined on a second time interval that is shorter than the first time interval), and so on.

At operation 440, after the electronic device determines the compliance condition is compliant, the electronic device may continue determining compliance conditions. The flow may then proceed to operation 450 where the electronic device may determine whether or not a location of the mobile device has changed. If not, the flow may return to operation 430 where the electronic device again determines compliance condition. Otherwise, the flow may proceed to 460 where the electronic device may update the geo-fence of the new location before the flow returns to operation 430 where the electronic device again determines a compliance condition.

In various examples, this example method 400 may be implemented as a group of interrelated software modules or components that perform various functions discussed herein. These software modules or components may be executed within a cloud network and/or by one or more computing devices, such as the compliance-control device 102 and/or the compliance-monitoring device 101 of FIG. 1.

Although the example method 400 is illustrated and described as including particular operations performed in a particular order, it is understood that this is an example. In various implementations, various orders of the same, similar, and/or different operations may be performed without departing from the scope of the present disclosure.

For example, the method 400 is illustrated and described as determining a compliance condition and then determining whether or not the location has changed. However, it is understood that this is an example. In a number of implementations, compliance conditions and/or location changes may be evaluated and/or monitored in any number of different orders. Various configurations are possible and contemplated without departing from the scope of the present disclosure.

Figure 5:
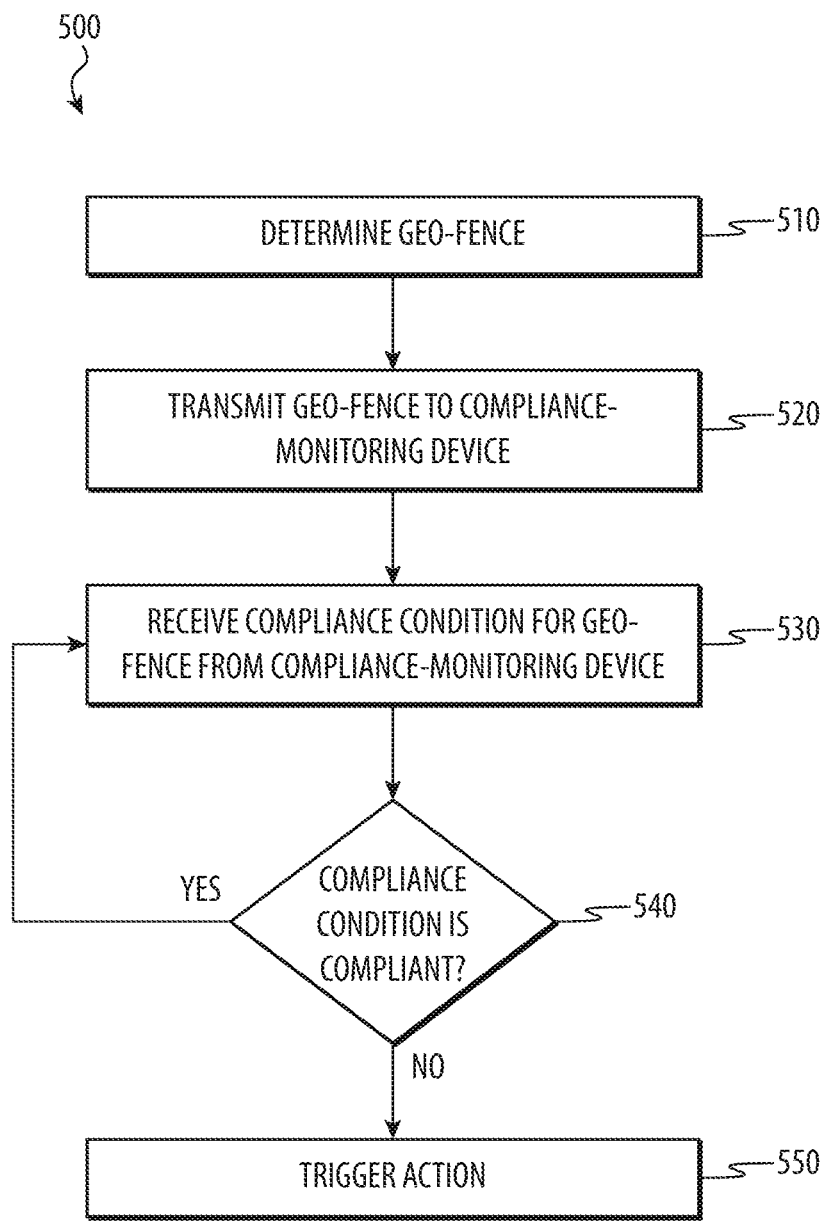
FIG. 5 depicts a flow chart illustrating a third example method for compliance control. This method may be performed by the system of FIG. 1.

FIG. 5 depicts a flow chart illustrating a third example method 500 for compliance control. This method 500 may be performed by the system 100 of FIG. 1.

At operation 510, an electronic device (such as the compliance-control device 102 of FIG. 1) may determine one or more geo-fence boundaries. At operation 520, the electronic device may transmit one or more of the geo-fence boundaries to a compliance-monitoring device. At operation 530, the electronic device may receive compliance conditions for the geo-fence boundary from the compliance-monitoring device.

At operation 540, the electronic device may determine whether or not the compliance conditions are compliant. If so, the flow may return to 530 where the electronic device continues to receive compliance information. Otherwise, the flow may proceed to 550 where the electronic device may trigger one or more actions related to non-compliance.

In various examples, this example method 500 may be implemented as a group of interrelated software modules or components that perform various functions discussed herein. These software modules or components may be executed within a cloud network and/or by one or more computing devices, such as the compliance-control device 102 and/or the compliance-monitoring device 101 of FIG. 1.

Although the example method 500 is illustrated and described as including particular operations performed in a particular order, it is understood that this is an example. In various implementations, various orders of the same, similar, and/or different operations may be performed without departing from the scope of the present disclosure.

For example, the method 500 is illustrated and described as using the same electronic device to determine geo-fence boundaries and evaluate and/or monitor compliance. However, in some implementations, different devices may be used to perform these functions. Various configurations are possible and contemplated without departing from the scope of the present disclosure.

Figure 6:
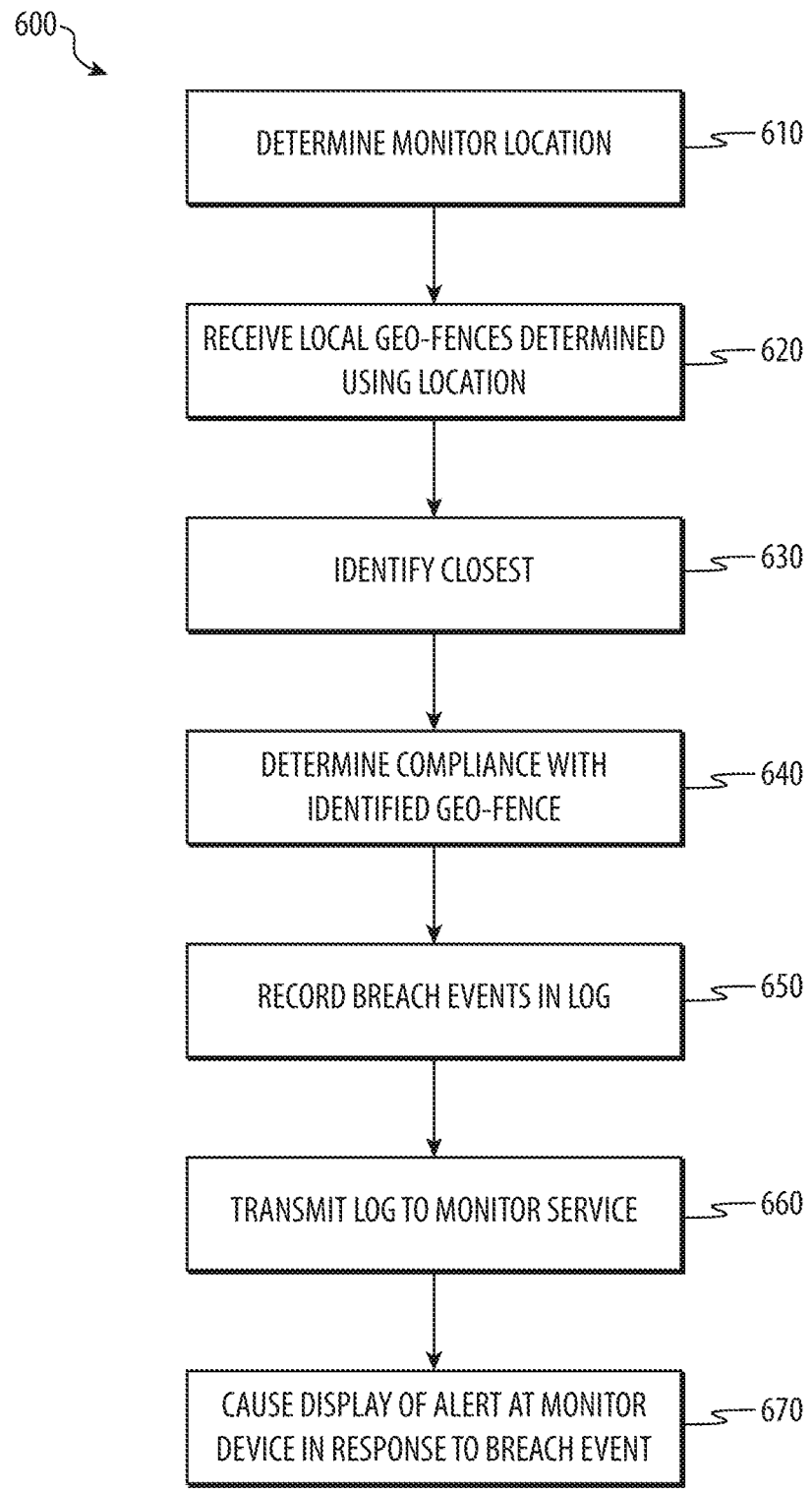
FIG. 6 depicts a flow chart illustrating a fourth example method for compliance control. This method may be performed by the system of FIG. 1.

FIG. 6 depicts a flow chart illustrating a fourth example method 600 for compliance control. This method 600 may be performed by the system 100 of FIG. 1.

At operation 610, an electronic device (such as the compliance-control device 102 of FIG. 1) may determine a location of a compliance-monitoring device. For example, the location of the compliance-monitoring device may be determined using a global positioning system.

At 620, a set of geo-fence boundaries may be received. The set of geo-fence boundaries may be received from a monitor servicer. The set of geo-fence boundaries may be determined, at least in part, by and/or using the location of the compliance-monitoring device.

At 630, a geo-fence boundary of the set of geo-fence boundaries may be identified as having the smallest distance to the compliance-monitoring device. At 640, compliance conditions with respect to the identified geo-fence boundary and a dynamic location of the compliance-monitoring device (or "compliance with the identified geo-fence") may be determined. Compliance conditions may be determined at a first time interval. In response to detection of a breach event, a set of subsequent compliance conditions may be determined at a second time interval that is shorter than the first time interval and a graphical output may present information regarding at least some of the compliance conditions and the set of subsequent compliance conditions. At 650, breach events may be recorded in a compliance log. For example, a breach event may be recorded in the compliance log if the dynamic location of the compliance-monitoring device is within the identified geo-fence boundary.

At 660, the compliance log may be transmitted to a monitor service. The compliance log may be transmitted to the monitor service at a third time interval that is greater than the first time interval or the second time interval.

At 670, the compliance-monitoring device may be caused to display one or more alerts in response to one or more breach events. For example, the compliance-monitoring device may be caused to display an alert in response to a breach event corresponding to the dynamic location of the compliance-monitoring device being within the identified geo-fence boundary.

In a number of examples, a compliance-monitoring device may be configured to determine a compliance condition by detecting whether or not the compliance-monitoring device is within one or more monitored geo-fence boundaries at a first time interval, such as every fifteen seconds. Upon detecting that the compliance-monitoring device is within such a monitored geo-fence boundary or other breach event, the compliance-monitoring device may be configured to provide an alert (such as an audio tone and a visual warning) warning of the lack of compliance with the geo-fence boundary. The breach event may also be logged in a compliance log. This may allow a person to leave an area. The compliance-monitoring device may be configured to determine a compliance condition again. The compliance-monitoring device may be configured to provide the alert a set number of times if the noncompliant compliance condition is maintained, such as three times. After the set number of times, the alert may no longer be provided. Instead, an alternate alert (such as bringing to the foreground and flashing a screen warning of non-compliance) may be provided less frequently than the alert, such as once a minute. Further, in response to detection of a breach event, a set of subsequent compliance conditions may be determined at a second time interval that is shorter than the first time interval and a graphical output may present information regarding at least some of the compliance conditions and the set of subsequent compliance conditions. If the non-compliant compliance conditioned is determined more than a threshold number of times, such as the set number of times, the compliance log may be reported. The compliance log may be reported at a third time interval that is longer than the first time interval or the second time interval. In a number of implementations, the order of these operations and the times and/or options involved may be configurable. In some implementations, the intervals may be throttled (such as changing the third time interval from one minute to fifteen minutes in situations where network traffic is high and/or non-compliance has not been recently detected). Various configurations are possible and contemplated without departing from the scope of the present disclosure.

In some examples, a compliance control system for monitoring a compliance-monitoring device over a geographic region may include a compliance-control device configured to display a graphical user interface having a map corresponding to at least a portion of the geographic region and an interface configured to receive a selection of a set of geo-fence boundaries, each geo-fence boundary associated with a business or entity of the geographic region. The compliance control system may also include a compliance-monitoring device communicably connected to the compliance-control device over a network. The compliance monitoring device may be configured to transmit an initial location to the compliance-control device; receive a subset of the set of geo-fence boundaries, the subset of geo-fence boundary selected, at least in part, based on the initial location; select a current geo-fence boundary from the set of geo-fence boundaries based, at least in part, on a current location of the compliance-monitoring device; determine a compliance condition of the current location of the compliance-monitoring device with respect to the current geo-fence on a first time interval; record a breach event in a compliance log, in response to the current location being within the current geo-fence; and transmit the compliance log to the compliance-control device on a second time interval that is greater than the first time interval. The compliance-control device may be configured to display a graphical output that corresponds to the compliance log in the graphical user interface.

In various examples, a compliance-monitoring device may be configured to suppress false positives. In some examples, the compliance-monitoring device may be configured to suppress a set number of false positives, such as ten, in order to avoid reporting non-compliance when a monitored person is actually compliant.

By way of illustration, a global positioning system may be used to determine location of a compliance-monitoring device for purposes of evaluating compliance conditions with respect to one or more geo-fence boundaries. However, the accuracy of position information from a global positioning system may vary greatly. For example, a compliance-monitoring device may be able to communicate with more satellites of a global positioning system in lower congestion areas than higher congestion areas, resulting in higher accuracy when operating in the lower congestion areas than higher congestion areas. It may be problematic when non-compliant compliance conditions are falsely determined based on such inaccuracies. As such, the compliance-monitoring device may be configured to suppress false positives.

For example, the compliance-monitoring device may evaluate a number of times the compliance-monitoring device is determined to be within a geo-fence boundary, accuracy of location information (such as an accuracy measurement provided in global positioning system data), path information (such as whether successive location information determinations indicate actual movement or jumps or other deviation indications that would not be possible or that the location information deviate from data from other sensors, such as one or more accelerometers), and so on. In some situations, the compliance-monitoring device may calculate a reporting measurement using these various factors (which may be dependent upon location of the compliance-monitoring device, a type of location associated with the geo-fence boundary, whether or not non-compliance has been detected within a threshold period of time, current network conditions, and so on) and then determine that a detected non-compliant compliance condition is valid and report if the reporting measurement is above a false positive threshold.

By way of illustration, the compliance-monitoring device may detect that it is within a geo-fence boundary that is associated with a bar. However, the compliance-monitoring device may not report this if the compliance-monitoring device does not detect continued presence within the geo-fence boundary at least ten times sequentially, as less might indicate simple proximity and possible location information inaccuracy instead of actual presence in the bar. Further, the compliance-monitoring device may not report if the location information includes an accuracy determination that indicates it may not be sufficiently accurate (and/or is otherwise determined to be possibly inaccurate). Moreover, the compliance-monitoring device may not report if successive location information determinations indicate a jump or other deviation indication that would not be possible, such as successive location determinations a block apart within fifteen seconds and/or successive location determinations that indicate a high rate of movement deviating from accelerometer data that indicate a low rate of movement.

By suppressing false positives, the compliance-monitoring device may avoid triggering burdensome \ enforcement in situations where it is not merited. Various configurations are possible and contemplated without departing from the scope of the present disclosure.

In various examples, this example method 600 may be implemented as a group of interrelated software modules or components that perform various functions discussed herein. These software modules or components may be executed within a cloud network and/or by one or more computing devices, such as the compliance-control device 102 and/or the compliance-monitoring device 101 of FIG. 1.

Although the example method 600 is illustrated and described as including particular operations performed in a particular order, it is understood that this is an example. In various implementations, various orders of the same, similar, and/or different operations may be performed without departing from the scope of the present disclosure.

For example, the method 600 is illustrated and described as identifying and evaluating the geo-fence boundary of the transmitted set of geo-fence boundaries that is the smallest distance to the compliance-monitoring device. However, it is understood that this is an example. In various implementations, the entire transmitted geo-fence boundaries and/or any subset thereof may be evaluated. Various configurations are possible and contemplated without departing from the scope of the present disclosure.

Figure 7:
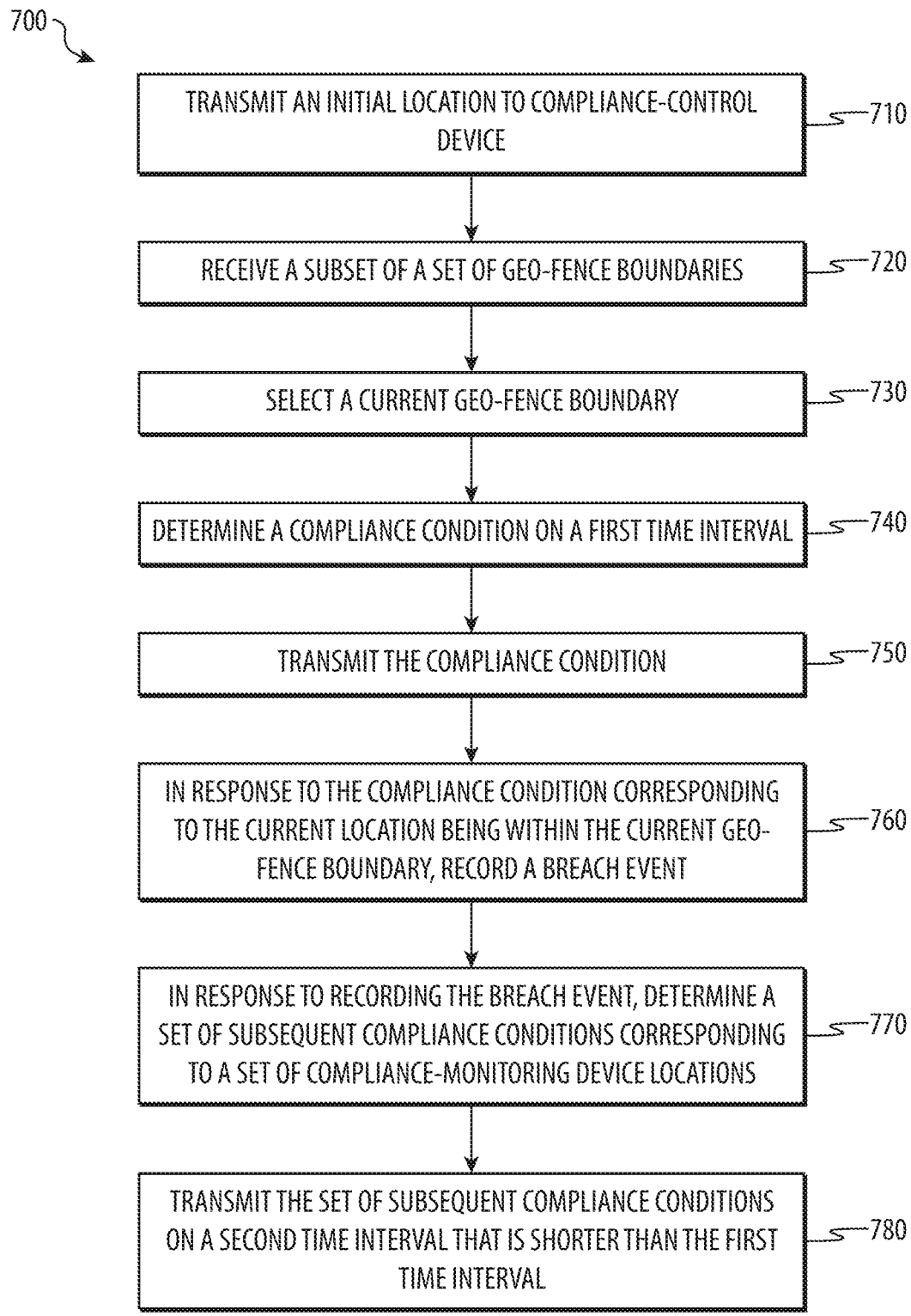
FIG. 7 depicts a flow chart illustrating a fifth example method 700 for compliance control. This method may be performed by the system of FIG. 1.

FIG. 7 depicts a flow chart illustrating a fifth example method 700 for compliance control. This method 700 may be performed by the system 100 of FIG. 1.

At 710, an electronic device (such as the compliance-monitoring device 101 of FIG. 1) may transmit an initial location to a compliance-control device. For example, the initial location may be determined using a global positioning system.

At 720, the electronic device may receive a subset of a set of geo-fence boundaries. The electronic device may receive the subset from the compliance-control device. The set of geo-fence boundaries may have been received by the compliance-control device as selections from a map corresponding to at least a portion of a geographic region. Each geo-fence boundary may associated with a business or entity of the geographic region. The subset of geo-fence boundary may be selected, at least in part, based on the initial location.

At 730, the electronic device may select a current geo-fence boundary from the set of geo-fence boundaries based, at least in part, on a current location of the electronic device.

At 740, the electronic device may determine a compliance condition of the current location of the electronic device with respect to the current geo-fence boundary on a first time interval. At 750, the electronic device may transmit the compliance condition. The electronic device may transmit the compliance condition to the compliance-control device.

At 760, in response to the compliance condition corresponding to the current location being within the current geo-fence boundary, the electronic device may record a breach event. The electronic device may record the breach event in a compliance log. The electronic device may transmit the compliance log to the compliance-control device. The electronic device may transmit the compliance log to the compliance-control device. The electronic device may transmit the compliance log to the compliance-control device at a longer time interval than the first time interval.

At 770, in response to recording the breach event, the electronic device may determine a set of subsequent compliance conditions corresponding to a set of compliance-monitoring device locations. At 780, the electronic device may transmit the set of subsequent compliance conditions on a second time interval that is shorter than the first time interval. The electronic device may transmit the set of subsequent compliance conditions to the compliance-control device. In various implementations, the compliance-control device may be configured to display a graphical output that corresponds to the compliance condition and one or more of the subsequent compliance conditions.

In various examples, this example method 700 may be implemented as a group of interrelated software modules or components that perform various functions discussed herein. These software modules or components may be executed within a cloud network and/or by one or more computing devices, such as the compliance-control device 102 and/or the compliance-monitoring device 101 of FIG. 1.

Although the example method 700 is illustrated and described as including particular operations performed in a particular order, it is understood that this is an example. In various implementations, various orders of the same, similar, and/or different operations may be performed without departing from the scope of the present disclosure.

For example, the method 700 is illustrated and described as, in response to recording the breach event, determining a set of subsequent compliance conditions corresponding to a set of compliance-monitoring device locations and transmitting the set of subsequent compliance conditions on a second time interval that is shorter than the first time interval. However, it is understood that this is an example. In various implementations, these actions may be performed in response to particular types of breaches, in response to a threshold number of breach events, and so on. Various configurations are possible and contemplated without departing from the scope of the present disclosure.

In various embodiments, a compliance control system for monitoring a compliance-monitoring device over a geographic region may include a compliance-control device and a compliance-monitoring device communicably connected to the compliance-control device over a network. The compliance-control device may be configured to display a graphical user interface including a map corresponding to at least a portion of the geographic region; and an interface configured to receive a selection of a set of geo-fence boundaries, each geo-fence boundary associated with a business or entity of the geographic region. The compliance monitoring device may be configured to transmit an initial location to the compliance-control device; receive a subset of the set of geo-fence boundaries, the subset of geo-fence boundary selected, at least in part, based on the initial location; select a current geo-fence boundary from the set of geo-fence boundaries based, at least in part, on a current location of the compliance-monitoring device; determine a compliance condition of the current location of the compliance-monitoring device with respect to the current geo-fence boundary on a first time interval; transmit the compliance condition; in response to the compliance condition corresponding to the current location being within the current geo-fence boundary, record a breach event; in response to recording the breach event, determine a set of subsequent compliance conditions corresponding to a set of compliance-monitoring device locations; and transmit the set of subsequent compliance conditions on a second time interval that is shorter than the first time interval. The compliance-control device may be configured to display a graphical output that corresponds to the compliance condition and one or more of the subsequent compliance conditions.

In some examples, the compliance-monitoring device may be configured to determine whether to suppress a detected breach event by calculating a reporting measurement using a number of times the detected breach event is detected, an accuracy of the current location, and a deviation indication; suppressing the detected breach event in response to the reporting measurement not exceeding a threshold; and recording the detected breach event in the compliance log in response to the reporting measurement meeting or exceeding the threshold. In various implementations of such examples, the compliance-monitoring device may determine a set of sample locations over a sample period of time. In a number of implementations of such examples, the compliance-monitoring device may determine the number of times the detected breach event is detected using the set of sample locations. In various implementations of such examples, the compliance-monitoring device may determine the deviation indication by comparing distances between locations of the set of sample locations.

In a number of examples, the compliance-monitoring device may receive the subset of the set of geo-fence boundaries from the compliance-control device.

In various examples, the compliance-monitoring device may record the breach event in a compliance log and transmit the compliance log to the compliance-control device. In some examples, the compliance-monitoring device may transmit the compliance log to the compliance-control device on a third time interval that is longer than the first time interval. In a number of examples, the compliance-monitoring device may determine the compliance condition by identifying the current geo-fence boundary of the set of geo-fence boundaries as having the smallest distance to a current location of the compliance-monitoring device and detecting when the current location is within the current geo-fence boundary. In various examples, the compliance-monitoring device may determine that a detected breach event is a false positive non-compliance with the set of geo-fence boundaries and suppress the detected breach event.

In some embodiments, a compliance control system for monitoring a compliance-monitoring device over a geographic region may include a compliance-control device and a compliance-monitoring device communicably connected to the compliance-control device over a network. The compliance-control device may be configured to provide an interface; receive a selection of a type of entity for which to generate a geo-fence boundary via the interface; query a points of interest database using the type for at least a portion of the geographic region; receive location information for the type from the points of interest database; and generate the geo-fence boundary using the location information. The compliance-monitoring device may be configured to determine and transmit a compliance condition of a current location of the compliance-monitoring device with respect to the geo-fence boundary to the compliance-control device.

In various examples, the compliance-control device may generate the geo-fence boundary using a geo-fence shape selected from a library of geo-fence shapes according to the type. In some examples, the compliance-control device may specify an area associated with a monitored person when querying the points of interest database.

In a number of embodiments, a compliance-control device may include a non-transitory storage medium that stores instructions and a processor that executes the instructions, the processor configured to display a map; receive a selection of a location from the map; determine an entity associated with the selection; generate a geo-fence boundary around the selection using a library of geo-fence shapes; receive a compliance condition of a current location of a compliance-monitoring device with respect to the geo-fence boundary on a first time interval; after detection of a breach event, receive a set of subsequent compliance conditions corresponding to a set of compliance-monitoring device locations on a second time interval that is shorter than the first time interval; and display a graphical output that corresponds to the compliance condition and one or more of the subsequent compliance conditions.

In some examples, the library may include a number of polygonal geo-fence shapes. In various examples, the library may include a number of different sized shapes. In a number of examples, the processor may select a shape from the library based on the entity. In various examples, the processor may present a shape menu in response to the selection and determines a shape from the library according to a menu selection from the shape menu.

In some examples, the processor may transmit the geo-fence boundary to the compliance-monitoring device. In various implementations of such examples, the processor may determine the breach event by evaluating the compliance condition to determine that the current location is within the geo-fence boundary.

In a number of embodiments, a compliance control system for monitoring a compliance-monitoring device over a geographic region may include a compliance-control device configured to display a graphical user interface having a map corresponding to at least a portion of the geographic region and an interface configured to receive a selection of a set of geo-fence boundaries, each geo-fence boundary associated with a business or entity of the geographic region. The compliance control system may also include a compliance-monitoring device communicably connected to the compliance-control device over a network. The compliance monitoring device may be configured to transmit an initial location to the compliance-control device; receive a subset of the set of geo-fence boundaries, the subset of geo-fence boundary selected, at least in part, based on the initial location; select a current geo-fence boundary from the set of geo-fence boundaries based, at least in part, on a current location of the compliance-monitoring device; determine a compliance condition of the current location of the compliance-monitoring device with respect to the current geo-fence on a first time interval; record a breach event in a compliance log, in response to the current location being within the current geo-fence; and transmit the compliance log to the compliance-control device on a second time interval that is greater than the first time interval. The compliance-control device may be configured to display a graphical output that corresponds to the compliance log in the graphical user interface.

In some examples, the compliance-monitoring device may determine whether to suppress a detected breach event by calculating a reporting measurement using a number of times the detected breach event is detected, an accuracy of the current location, and a deviation indication; suppressing the detected breach event if the reporting measurement does not exceed a threshold; and recording the breach event in the compliance log if the reporting measurement at least meets the threshold. In various such examples, the compliance-monitoring device may determine a sequence of locations over a period of time. In some cases of such examples, the compliance-monitoring device may determine the number of times the detected breach event is detected using the sequence of locations. In various cases of such examples, the compliance-monitoring device may determine the deviation indication by comparing locations of the sequence of locations.

In various examples, the compliance-monitoring device may receive the subset of the set of geo-fence boundaries from the compliance-control device. In a number of examples, the compliance-monitoring device may transmit the compliance log to the compliance-control device.

In various examples, the compliance-monitoring device may determine the compliance by identifying a geo-fence boundary of the set of geo-fence boundaries having the smallest distance to a current location of the compliance-monitoring device at a first time interval and record the breach event if the current location is within the geo-fence boundary. In some such examples, the compliance-monitoring device may transmit the compliance log at a second time interval that is greater than the first time interval.

In a number of examples, the compliance-monitoring device may suppress a false positive non-compliance with the set of geo-fence boundaries.

In some embodiments, a compliance control system for monitoring a compliance-monitoring device over a geographic region may include a compliance-control device configured to provide an interface, receive a selection of a type of entity for which to generate a geo-fence boundary via the interface, query a points of interest database using the type for at least a portion of the geographic region, receive location information for the type from the points of interest database, and generate the geo-fence boundary using the location information. The compliance control system may also include a compliance-monitoring device communicably connected to the compliance-control device over a network. In a number of examples, the compliance-control device may generate the geo-fence boundary using a geo-fence shape selected from a library of geo-fence shapes according to the type. In various examples, the compliance-control device may specify an area associated with a monitored person when querying the points of interest database.

In various implementations, a compliance-control device may include a non-transitory storage medium that stores instructions and a processor. The processor may execute the instructions to display a map, receive a selection of a location from the map, determine an entity associated with the selection, generate a geo-fence boundary around the selection using a library of geo-fence shapes, and determine compliance with the geo-fence boundary by communicating with a compliance-monitoring device.

In some examples, the library may include a number of polygonal geo-fence shapes. In various examples, the library may include a number of different sized shapes.

In a number of examples, the processor may select a shape from the library based on the entity. In various examples, the processor may present a shape menu in response to the selection and determine a shape from the library according to a menu selection from the shape menu.

In various examples, the processor may transmit the geo-fence boundary to the compliance-monitoring device. In a number of such examples, the processor may determine the compliance based on compliance information received from the compliance-monitoring device.

In some implementations, a compliance-control computer program product may be tangibly embodied in a non-transitory machine readable medium The compliance-control computer program product may include a first set of instructions, stored in the non-transitory machine readable medium, executable by a processor to provide a graphical user interface that is operative to receive a selection of a location from a displayed map, provide a menu of options corresponding to a library of geo-fence shapes, and receive a selection of an option from the menu; a second set of instructions, stored in the non-transitory machine readable medium, executable by the processor to generate a geo-fence boundary around the selection using a geo-fence shape from the library corresponding to the option; and a third set of instructions, stored in the non-transitory machine readable medium, executable by the processor to determine compliance with the geo-fence boundary by communicating with a compliance-monitoring device.

In various examples, the communicating with the compliance-monitoring device may include transmitting the geo-fence boundary to the compliance-monitoring device and receiving movement information of the compliance-monitoring device with respect to the geo-fence boundary from the compliance-monitoring device. In some examples, the option may correspond to a location type. In a number of examples, the option may be at least one of a bar or a liquor store. In various examples, the menu of options may be populated according to restrictions on a person associated with the compliance-monitoring device. In various examples, the location may correspond to a mobile device.

In some examples, the compliance-control computer program product may further include a fourth set of instructions stored in the non-transitory machine readable medium. The fourth set of instructions may be executable by the processor to receive an updated location for the mobile device and update the geo-fence boundary using the updated location.

In a number of implementations, a computer-implemented method for compliance control may include displaying a map using a processing unit, receiving a selection from the map using the processing unit, using the processing unit to generate a geo-fence boundary around the selection using a geo-fence shape selected from a library of geo-fence shapes according to an entity type associated with the selection, and determining compliance with the geo-fence boundary by using the processing unit to communicate with a compliance-monitoring device.

In some examples, the map may be displayed as part of a graphical user interface. In various examples, the entity type may include at least one of a bar, a liquor store, a dispensary, a gambling establishment, or a school. In a number of examples, determining the compliance may include receiving an indication that the compliance-monitoring device crossed the geo-fence boundary. In various examples, determining the compliance may include receiving an indication that the compliance-monitoring device has not crossed the geo-fence boundary. In some examples, the compliance-monitoring device may be a smart phone.

In various embodiments, a method of onboarding a compliance-monitoring device in a compliance monitoring system may include configuring the compliance-monitoring device with an initial configuration where the compliance-monitoring device is set to monitor a first set of data and using an identifier for a specific offender to configure the compliance-monitoring device for the specific offender so that the compliance-monitoring device monitors a second set of data that is a subset of the first set of data. In some examples, using the identifier for the specific offender to configure the compliance-monitoring device may be performed upon establishing a communication connection between the compliance monitoring system and the compliance-monitoring device. In a number of examples, the method may further include providing the identifier to the compliance-monitoring device via a QR code.

As described above and illustrated in the accompanying figures, the present disclosure relates to a system that performs compliance control. This may include a compliance-control device displaying a map, receiving a selection of a location from the map, determining an entity associated with the selection, generating a geo-fence boundary around the selection using a library of geo-fence shapes, and determining a compliance condition with the geo-fence boundary by communicating with a compliance-monitoring device. In some examples, the location may correspond to the compliance-monitoring device and the geo-fence boundary may be updated according to movement of the compliance-monitoring device. In various examples, the geo-fence boundary may be transmitted to the compliance-monitoring device and the compliance condition may be determined according to information received from the compliance-monitoring device regarding whether or not the compliance-monitoring device is within the geo-fence boundary. In various examples, the compliance-monitoring device may determine and transmit a compliance condition on a first time interval. In response to a breach event, the compliance-monitoring device may determine and transmit a set of subsequent compliance conditions on a second time interval that is shorter than the first time interval. The compliance-control device may display a graphical output that corresponds to the compliance condition and one or more of the subsequent compliance conditions. In this way, software and/or hardware resources can be conserved with less frequent compliance condition monitoring in the absence of a breach event balanced with targeted increased resource consumption in response to detected breach.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A compliance control system for monitoring a compliance-monitoring device over a geographic region, the compliance control system comprising:
a compliance-control device configured to display a graphical user interface configured to receive a selection of a set of geo-fence boundaries; and
the compliance-monitoring device communicably connected to the compliance-control device over a network, the compliance-monitoring device configured to:
transmit an initial location to the compliance-control device;
receive a subset of the set of geo-fence boundaries, the subset of the set of geo-fence boundaries selected, at least in part, based on the initial location;
determine a compliance condition of a current location of the compliance-monitoring device with respect to a current geo-fence boundary on a first time interval;
transmit the compliance condition;
in response to the compliance condition corresponding to the current location being within the current geo-fence boundary, record a breach event;

in response to recording the breach event, determine a set of subsequent compliance conditions corresponding to a set of compliance-monitoring device locations; and transmit the set of subsequent compliance conditions on a second time interval that is shorter than the first time interval; wherein:

the compliance-control device is configured to display a graphical output that corresponds to the compliance condition and one or more of the set of subsequent compliance conditions.

2. The system of claim 1, wherein the graphical user interface includes a map corresponding to at least a portion of the geographic region.

3. The system of claim 1, wherein the set of geo-fence boundaries is generated using a library of geo-fence shapes.

4. The system of claim 1, wherein the set of geo-fence boundaries is generated using a points of interest database.

5. The system of claim 1, wherein each geo-fence boundary is associated with a business or entity of the geographic region.

6. The system of claim 1, wherein:
the first time interval is less than five minutes; and
the second time interval is less than a minute.

7. The system of claim 1, wherein the compliance-monitoring device:
records the breach event in a compliance log; and
transmits the compliance log to the compliance-control device.

8. The system of claim 7, wherein the compliance-monitoring device transmits the compliance log to the compliance-control device on a third time interval that is longer than the first time interval.

9. The system of claim 1, wherein the compliance-monitoring device determines whether a detected breach event is a false positive non-compliance with the set of geo-fence boundaries.

10. The system of claim 9, wherein the compliance-monitoring device suppresses the detected breach event in response to determining that the detected breach event is the false positive non-compliance with the set of geo-fence boundaries.

11. A compliance control system for monitoring a compliance-monitoring device over a geographic region, the compliance control system comprising:
a compliance-control device configured to provide an interface operable to generate a geo-fence boundary in response to a received selection; and
the compliance-monitoring device, communicably connected to the compliance-control device over a network, is configured to:
determine and transmit a compliance condition of a current location of the compliance-monitoring device with respect to the geo-fence boundary to the compliance-control device on a first time interval;
in response to the compliance condition of the current location being within the geo-fence boundary, record a breach event;

in response to recording the breach event, determine a set of subsequent compliance conditions corresponding to a set of compliance-monitoring device locations; and transmit the set of subsequent compliance conditions on a second time interval that is shorter than the first time interval.

12. The system of claim 11, wherein the compliance-monitoring device determines the compliance condition more frequently than the compliance-monitoring device transmits the compliance condition to the compliance-control device.

13. The system of claim 11, wherein the compliance-monitoring device determines whether the compliance condition is a false positive.

14. The system of claim 11, wherein:
the compliance-monitoring device is configured to determine whether to suppress a detected breach event by:
calculating a reporting measurement; and
suppressing the detected breach event in response to the reporting measurement not exceeding a threshold.

15. The system of claim 14, wherein the compliance-monitoring device calculates the reporting measurement using:
a number of times the detected breach event is detected;
an accuracy of the current location; and
a deviation indication.

16. The system of claim 14, wherein the compliance-monitoring device records the detected breach event in a compliance log in response to the reporting measurement meeting or exceeding the threshold.

17. A compliance-control device, comprising:
a non-transitory storage medium that stores instructions; and
a processor that executes the instructions, the processor configured to:
generate a geo-fence boundary in response to a selection of a location;
receive a compliance condition of a current location of a compliance-monitoring device with respect to the geo-fence boundary on a first time interval; and
after detection of a breach event, receive a set of subsequent compliance conditions corresponding to a set of compliance-monitoring device locations on a second time interval that is shorter than the first time interval.

18. The device of claim 17, wherein the processor displays a graphical output that corresponds to the compliance condition and one or more of the set of subsequent compliance conditions.

19. The device of claim 17, wherein the processor determines the breach event by evaluating the compliance condition to determine that the current location is within the geo-fence boundary.

20. The device of claim 19, wherein the processor signals the compliance-monitoring device to transmit the set of subsequent compliance conditions on the second time interval.

* * * * *